(12) United States Patent
Zhang et al.

(10) Patent No.: US 12,101,191 B2
(45) Date of Patent: Sep. 24, 2024

(54) INFORMATION TRANSMISSION METHOD AND DEVICE FOR TRANSMITTING HYBRID AUTOMATIC REPEAT REQUEST ACKNOWLEDGE (HARQ-ACK) CODEBOOK

(71) Applicant: ZTE Corporation, Guangdong (CN)

(72) Inventors: Shujuan Zhang, Guangdong (CN); Zhaohua Lu, Guangdong (CN); Xiyu Wang, Guangdong (CN); Chuangxin Jiang, Guangdong (CN); Huahua Xiao, Guangdong (CN); Zhen He, Guangdong (CN)

(73) Assignee: ZTE Corporation, Shenzhen (CN)

( * ) Notice: Subject to any disclaimer, the term of this patent is extended or adjusted under 35 U.S.C. 154(b) by 436 days.

(21) Appl. No.: 17/487,585

(22) Filed: Sep. 28, 2021

(65) Prior Publication Data

US 2022/0123872 A1 Apr. 21, 2022

Related U.S. Application Data

(63) Continuation of application No. PCT/CN2020/080905, filed on Mar. 24, 2020.

(30) Foreign Application Priority Data

Mar. 28, 2019 (CN) .......................... 201910245823.3

(51) Int. Cl.
*H04L 5/00* (2006.01)
*H04L 1/1812* (2023.01)

(52) U.S. Cl.
CPC .......... *H04L 1/1812* (2013.01); *H04L 5/0055* (2013.01)

(58) Field of Classification Search
CPC ..... H04L 1/1812; H04L 5/0055; H04L 5/001; H04L 5/0048; H04L 5/0051; H04L 5/0057; H04L 5/0094; H04L 1/1864; H04L 1/1861; H04L 1/1854; H04L 1/1896; H04W 72/23; H04W 72/0453; H04W 72/21
See application file for complete search history.

(56) References Cited

U.S. PATENT DOCUMENTS 10,686,562 B2 6/2020 Xiao et al.
2019/0074929 A1* 3/2019 Aiba .................... H04L 1/0025
(Continued)

FOREIGN PATENT DOCUMENTS

CN 108886437 A 11/2018
CN 110535571 A 12/2019
(Continued)

OTHER PUBLICATIONS

Qualcomm (Multi-TRP Enhancements, R1-1903043, Mar. 2019 (Mar. 1, 2019).*
(Continued)

*Primary Examiner* — Lakeram Jangbahadur
(74) *Attorney, Agent, or Firm* — Perkins Coie LLP

(57) ABSTRACT

Disclosed are information transmission methods and devices. In an embodiment, an information transmission method includes: determining second information including a frequency domain bandwidth set; determining a hybrid automatic repeat request acknowledge (HARQ-ACK) codebook to be transmitted according to the determined second information; and transmitting the HARQ-ACK codebook.

4 Claims, 4 Drawing Sheets

```
┌─ 100
Determine second information corresponding to a hybrid automatic repeat
request acknowledge (HARQ-ACK) codebook to be transmitted currently; where
the second information includes at least one of: a frequency domain bandwidth
set, first information, or high-layer signaling information
                    │
                    ▼
┌─ 101
Determine the HARQ-ACK codebook to be transmitted currently according to
the determined second information
                    │
                    ▼
┌─ 102
Transmit the determined HARQ-ACK codebook
```

(56) References Cited

U.S. PATENT DOCUMENTS

2019/0103943 A1\* 4/2019 Wang .................. H04L 1/1854
2020/0092068 A1\* 3/2020 Yang .................. H04L 1/1858

FOREIGN PATENT DOCUMENTS

| CN | 110798894 A | 2/2020 |
|----|-------------|--------|
| WO | 2018175820 A1 | 9/2018 |
| WO | 2019028875 A1 | 2/2019 |
| WO | 2019066630 A1 | 4/2019 |

OTHER PUBLICATIONS

Chinese office action issued in corresponding CN Patent Application No. 2022103343489, dated Nov. 30, 2022, 8 pages. English translation included.

Chinese Notification to Complete Formalities of Registration issued in corresponding CN Patent Application No. 2022103343489, dated Mar. 2, 2023, 4 pages. English translation included.

European Search Report for EP Patent Application No. 20777603.0, dated Nov. 28, 2022, 8 pages.

Qualcomm Incorporated, "Multi-TRP Enhancements," 3GPP TSG-RAN WG1 Meeting #96, R1-1903043, Feb. 25-Mar. 1, 2019, Athens, Greece, 30 pages.

3GPP, "3rd Generation Partnership Project; Technical Specification Group Radio Access Network; NR; Physical Layer Procedures for Control (Release 15)," TS 38.213 V15.5.0, 104 pages, Mar. 27, 2019.

Ericsson, "On Multi-TRP and Multi-panel," 3GPP TSG RAN WG1 Meeting #96, Athens, Greece, R1-1902540, Feb. 25-Mar. 1, 2019, 11 pages.

Huawei et al., "Enhancements on Multi-TRP/Panel Transmission," 3GPP TSG RAN WG1 Meeting #96, Athens, Greece, R1-1901567, Feb. 25-Mar. 1, 2019, 14 pages.

Huawei et al., "Summary of AI: 7.2.8.2 Enhancements on Multi-TRP/Panel Transmission of Offline Discussion," 3GPP TSG RAN WG1 Meeting #96, Athens, Greece, R1-1903541 (R1-190abcd), Feb. 25-Mar. 1, 2019, 59 pages.

International Search Report and Written Opinion mailed on Jun. 18, 2020 for International Application No. PCT/CN2020/080905, filed on Mar. 24, 2020 (17 pages).

Indian First Examination Report issued in IN Patent Application No. 202147048924, dated Oct. 30, 2023, 6 pages.

Vivo, "Remaining issues on DL/UL scheduling and HARQ," 3GPP TSG RAN WG1 Meeting 91, R1-1719794, Reno, USA, Nov. 27-Dec. 1, 2017, 6 pages.

Australian Examination Report issued in AU Patent Application No. 2020246742, dated Feb. 14, 2024, 3 pages.

\* cited by examiner

| HARQ-ACK feedback codebook 1 | 3-bit HARQ-ACK feedback of CC1 | 2-bit HARQ-ACK feedback of CC2 | 4-bit HARQ-ACK feedback of CC3 |

| HARQ-ACK feedback codebook 2 | 3-bit HARQ-ACK feedback of CC1 | 2-bit HARQ-ACK feedback of CC2 | 4-bit HARQ-ACK feedback of CC3 |

FIG. 4

| HARQ-ACK feedback codebook 1 | 3-bit HARQ-ACK feedback of CC1 | 2-bit HARQ-ACK feedback of CC2 | 4-bit HARQ-ACK feedback of CC3 |

| HARQ-ACK feedback codebook 2 | | 2-bit HARQ-ACK feedback of CC2 | 4-bit HARQ-ACK feedback of CC3 |

FIG. 5

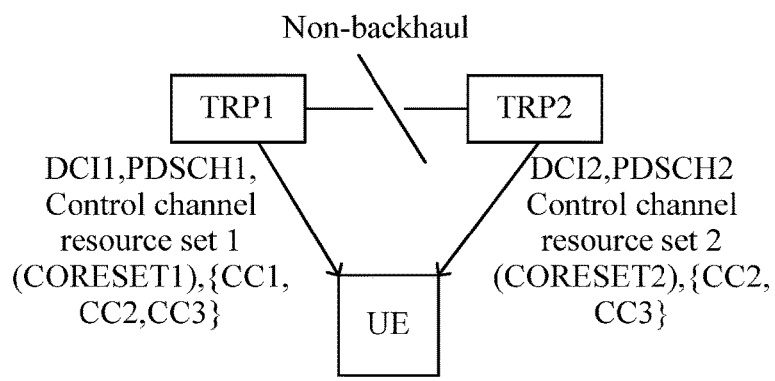

FIG. 6

| HARQ-ACK feedback codebook 1 | 3-bit HARQ-ACK feedback of CC1 | 2-bit HARQ-ACK feedback of CC2 | 4-bit HARQ-ACK feedback of CC3 |

| HARQ-ACK feedback codebook 2 | 5-bit HARQ-ACK feedback of CC1 | 3-bit HARQ-ACK feedback of CC2 | 6-bit HARQ-ACK feedback of CC3 |

| MAC-CE | PUCCH | | | Action time of the MAC-CE command |
|---|---|---|---|---|
| ←Slot n→ | ←Slot n+1→ | ←Slot n+2→ | ←Slot n+3→ | ←Slot n+4→ |

INFORMATION TRANSMISSION METHOD AND DEVICE FOR TRANSMITTING HYBRID AUTOMATIC REPEAT REQUEST ACKNOWLEDGE (HARQ-ACK) CODEBOOK

CROSS REFERENCE TO RELATED APPLICATIONS

The present application is a continuation of International Patent Application No. PCT/CN2020/080905, filed on Mar. 24, 2020, which claims priority to Chinese Patent Application No. 201910245823.3, filed with the China National Intellectual Property Administration (CNIPA) on Mar. 28, 2019, the contents of each of which are incorporated herein by reference in their entirety.

TECHNICAL FIELD

Embodiments of the present disclosure relate to communication technologies, for example, an information transmission method and device, an information determination method and device, a signaling information transmission method and device, a parameter acquisition method and device, and a storage medium.

BACKGROUND

In the case where multiple transmission reception points (TRPs) independently schedule the same user equipment (UE), especially when there is no ideal backhaul (non-backhaul) among multiple TRPs, how the UE feeds back a hybrid automatic repeat request acknowledge (HARQ-ACK) is one of the problems to be solved herein.

When the multiple TRPs are in communication with the UE, another problem to be solved herein is how to reduce the signaling overhead and the interference existing in the communication among the multiple TRPs and the UE while guaranteeing the parameter flexibility.

SUMMARY

The embodiments of the present disclosure provide an information transmission method and device so as to realize HARQ-ACK feedback when multiple TRPs independently schedule the same UE.

An embodiment of the present disclosure provides an information transmission method. The information transmission method includes steps described below, second information corresponding to a hybrid automatic repeat request acknowledge (HARQ-ACK) codebook to be transmitted currently is determined; the HARQ-ACK codebook to be transmitted is determined according to the determined second information; and the determined HARQ-ACK codebook is transmitted; where the second information includes at least one of: a frequency domain bandwidth set, first information, or high-layer signaling information.

An embodiment of the present disclosure provides an information transmission device. The information transmission device includes a first determination module, a second determination module and a codebook transmission module. The first determination module is configured to determine second information corresponding to a hybrid automatic repeat request acknowledge (HARQ-ACK) codebook to be transmitted currently. The second determination module is configured to determine the HARQ-ACK codebook to be transmitted currently according to the determined second information. The codebook transmission module is configured to transmit the determined HARQ-ACK codebook. The second information includes at least one of: a frequency domain bandwidth set, first information, or high-layer signaling information.

An embodiment of the present disclosure provides an information transmission device. The information transmission device includes a processor and a computer-readable storage medium. The computer-readable storage medium stores an instruction, and when the instruction is executed by the processor, the information transmission method described above is implemented.

An embodiment of the present disclosure provides a computer-readable storage medium. The computer-readable storage medium stores a computer program. When the computer program is executed by a processor, the information transmission method described above is implemented.

The embodiments of the present disclosure include that: second information corresponding to a hybrid automatic repeat request acknowledge (HARQ-ACK) codebook to be transmitted currently is determined; the HARQ-ACK codebook to be transmitted currently is determined according to the determined second information; and the determined HARQ-ACK codebook is transmitted; where the second information includes at least one of: a frequency domain bandwidth set, first information, or high-layer signaling information. According to the embodiments of the present disclosure, the HARQ-ACK feedback is realized based on the second information when the same UE is independently scheduled among multiple TRPs.

The embodiments of the present disclosure provide an information determination method and device so as to reduce the signaling overhead.

An embodiment of the present disclosure provides an information determination method. The information determination method includes steps described below, group information is determined and third information is determined according to the group information; or group information is determined according to third information.

The group information includes at least one of: downlink control channel resource group information, antenna group information, or measurement reference signal resource group information.

The third information includes at least one of the following information:
- a seventh correspondence between the group information and a fourth-type parameter set;
- quasi co-location reference signal information of a channel and/or signal; where a time interval between a control channel scheduling the channel and/or signal and the channel and/or signal is less than a predetermined threshold;
- a merging of uplink control information;
- an uplink channel where uplink control information is located;
- a channel and/or signal to which one piece of downlink control information is applicable; or
- a monitoring of a downlink control channel;
- a maximum number of different quasi co-location reference signals associated with spatial receive parameters of B channels and/or signals; where an intersection among time domain resources occupied by the B channels and/or signals is non-empty;
- a maximum number of spatial transmit filters of H channels and/or signals; where an intersection among time domain resources occupied by the H channels and/or signals is non-empty;

an eighth correspondence between the group information and a channel and/or signal; or a monitoring of downlink control information in a predetermined format; where the predetermined format includes at least one of: downlink control information DCI2_0, DCI2_1, DCI2_2, or DCI23;

where each of B and H is an integer greater than 1.

An embodiment of the present disclosure provides an information determination device. The information determination device includes a third determination module. The third determination module is configured to determine group information and determine third information according to the group information; or determine group information according to third information.

The group information includes at least one of: downlink control channel resource group information, antenna group information, or measurement reference signal resource group information.

The third information includes at least one of the following information:

a seventh correspondence between the group information and a fourth-type parameter set;

quasi co-location reference signal information of a channel and/or signal; where a time interval between a control channel scheduling the channel and/or signal and the channel and/or signal is less than a predetermined threshold;

a merging of uplink control information;

an uplink channel where uplink control information is located;

a channel and/or signal to which one piece of downlink control information is applicable; or a monitoring of a downlink control channel;

a maximum number of different quasi co-location reference signals associated with spatial receive parameters of B channels and/or signals; where an intersection among time domain resources occupied by the B channels and/or signals is non-empty;

a maximum number of spatial transmit filters of H channels and/or signals; where an intersection among time domain resources occupied by the H channels and/or signals;

an eighth correspondence between the group information and a channel and/or signal; or a monitoring of downlink control information in a predetermined format; where the predetermined format includes at least one of: downlink control information DCI2_0, DCI2_1, DCI2_2, or DCI2_3;

where each of B and H is an integer greater than 1.

An embodiment of the present disclosure provides an information determination device. The information determination device includes a processor and a computer-readable storage medium. The computer-readable storage medium stores an instruction, and when the instruction is executed by the processor, the information determination method described above is implemented.

An embodiment of the present disclosure provides a computer-readable storage medium. The computer-readable storage medium stores a computer program. When the computer program is executed by a processor, the information determination method described above is implemented.

The embodiments of the present disclosure include that: group information is determined and third information is determined according to the group information; or group information is determined according to third information. The embodiments of the present disclosure can determine the third information based on the group information or determine the group information based on the third information so that the signaling overhead is reduced, different communication nodes using different parameters are effectively supported, and channels and/or signals among different communication nodes are separated from each other.

The embodiments of the present disclosure provide a signaling information transmission method so as to reduce the signaling overhead.

An embodiment of the present disclosure provides a signaling information transmission method. The signaling information transmission method includes steps described below, first signaling information is transmitted; where the first signaling information includes a spatial relation information list and one piece of spatial relation information corresponding to an uplink control channel resource group.

An embodiment of the present disclosure provides a signaling information transmission device. The signaling information transmission device includes a fourth determination module. The fourth determination module is configured to transmit first signaling information, where the first signaling information includes a spatial relation information list and one piece of spatial relation information corresponding to an uplink control channel resource group.

An embodiment of the present disclosure provides a signaling information transmission device. The signaling information transmission device includes a processor and a computer-readable storage medium. The computer-readable storage medium stores an instruction, and when the instruction is executed by the processor, the signaling information transmission method described above is implemented.

An embodiment of the present disclosure provides a computer-readable storage medium. The computer-readable storage medium stores a computer program. When the computer program is executed by a processor, the signaling information transmission method described above is implemented.

BRIEF DESCRIPTION OF DRAWINGS

FIG. 4 is a schematic diagram illustrating that HARQ-ACK codebooks corresponding to two TRPs include bits of HARQ-ACKs of all PDSCHs configured with CCs when a base station configures three component carriers (CCs) for a terminal according to an embodiment of the present disclosure;

FIG. 5 is a schematic diagram illustrating a bit structure of HARQ-ACK codebooks that the HARQ-ACK codebooks corresponding to different TRPs include HARQ-ACK bits of PDSCHs in different CC combinations when a base station configures three CCs for a terminal and actually working CC combinations of two TRPs are different according to an embodiment of the present disclosure;

FIG. 6 is a schematic diagram illustrating different working CC combinations of two TRPs in the case where the same UE is independently scheduled by two TRPs having no ideal backhaul (non-backhaul) according to an embodiment of the present disclosure;

DETAILED DESCRIPTION

Figure 1:
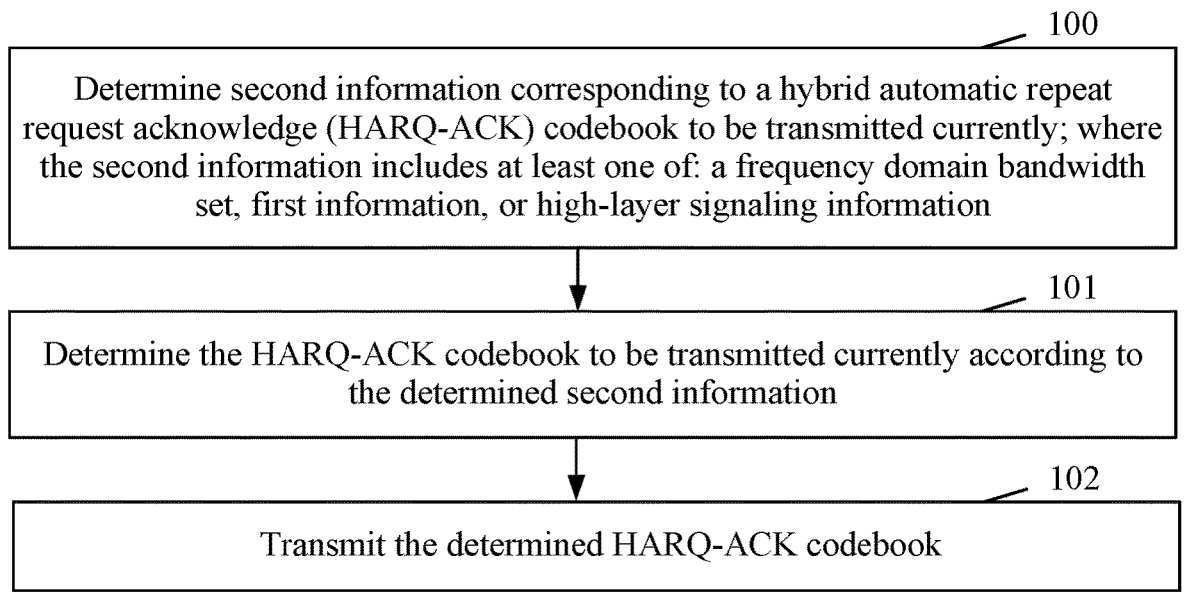
FIG. 1 is a flowchart of an information transmission method provided by an embodiment of the present disclosure.

Hereinafter, embodiments of the present disclosure will be described with reference to the accompanying drawings.

The steps shown in the flowcharts of the drawings may be executed in a computer system, such as a set of computer-executable instructions. Also, while a logical order is shown in the flowcharts, in some cases, steps shown or described may be performed in a different order than herein.

In the following embodiments, the control channel resource includes at least one of a control channel time domain resource, a control channel frequency domain resource, or a control channel spatial domain resource.

A downlink control channel resource includes one of: a control channel resource set (CORESET) (namely, a frequency domain resource and a spatial domain resource of the downlink control channel resource), a search space set (namely, a time domain resource and a frequency domain resource of the downlink control channel resource), a search space corresponding to one aggregation degree (namely, a time domain resource and a frequency domain resource of the downlink control channel resource), one time domain occasion of one search space set (namely, a time domain resource and a frequency domain resource of the downlink control channel resource), one frequency domain resource set of one CORESET (namely, a frequency domain resource of the downlink control channel resource), one control channel demodulation reference signal port group (namely, a spatial domain resource of the downlink control channel resource), a control channel resource corresponding to one quasi co-location reference signal set (namely, a spatial domain resource of the downlink control channel resource), or a control channel resource (namely, a time domain resource, a frequency domain resource and a spatial domain resource of the downlink control channel resource) included in configuration information of a physical downlink control channel (PDCCH).

The configuration information of the PDCCH includes PDCCH-config, configuration information of the CORE-SET, or control information of the search space.

In the following embodiments, the association between two pieces of information includes at least one of that: one piece of information may be obtained according to the other piece of information, a value range of one piece of information may be obtained according to a value of the other piece of information, some value combinations of the two pieces of information cannot occur at the same time, a correspondence exists between the two pieces of information, or second information of a channel and/or signal corresponding to first information is the second information corresponding to the first information, where the first information and the second information belong to the two pieces of information.

In the following embodiments, one physical uplink control channel (PUCCH) resource group corresponds to at least one of:

Manner one for dividing the PUCCH resource group: one PUCCH-config.

Manner two for dividing the PUCCH resource group: one or more PUCCH sets configured in one PUCCH-config, where each PUCCH set is associated with one uplink control information load.

For example, one PUCCH-config includes two PUCCH resource groups, a PUCCH resource group 1 includes {PUCCH set1, PUCCH set2, PUCCH set3}, and a PUCCH resource group 2 includes {PUCCH set4, PUCCH set5, PUCCH set6, PUCCH set7}. Each PUCCH set is associated with one uplink control information load, an intersection among uplink control information loads associated with different PUCCH sets in the same PUCCH resource group is empty, and an intersection among uplink control information loads associated with different PUCCH sets in different PUCCH resource groups may be non-empty.

A terminal firstly selects a PUCCH set in one PUCCH resource group according to the uplink control information load, then obtains one PUCCH resource in one PUCCH set according to signaling information and/or a predetermined rule in downlink control information (DCI), and sends uplink control information in the determined PUCCH resource.

Manner three for dividing the PUCCH resource group: PUCCH resources in each PUCCH set are divided into two PUCCH resource small groups, and one PUCCH resource group consists of one PUCCH resource small group in each PUCCH set; for example, there are four PUCCH sets, one PUCCH resource group consists of four PUCCH resource small groups, where different PUCCH small groups belong to different PUCCH sets.

Alternatively, only one PUCCH resource small group is included in part of the PUCCH sets, numbers of PUCCH resource small groups included in different PUCCH resource groups are different. For example, PUCCH sett includes {PUCCH resource small group 11, PUCCH resource small group 12}, PUCCH set2 includes {PUCCH resource small group 21, PUCCH resource small group 22}, PUCCH set3 includes {PUCCH resource small group 31}, and PUCCH set4 includes {PUCCH resource small group 41, PUCCH resource small group 42}, PUCCH resource group 1 is composed of {PUCCH small group 11 in PUCCH set1, PUCCH small group 21 in PUCCH set2, PUCCH small group 31 in PUCCH set3, PUCCH small group 41 in PUCCH set4}, and PUCCH resource group 2 is composed of {PUCCH small group 12 in PUCCH set1, PUCCH small group 22 in PUCCH set2, PUCCH small group 42 in PUCCH set4}.

Since each PUCCH set is associated with one uplink control information load, and the PUCCH resource group 2 does not have PUCCH set3, when a PUCCH set in PUCCH resource group 2 is determined according to an uplink control channel load, and a PUCCH resource in the PUCCH set is determined according to the signaling information and/or predetermined rule indicated in the DCI, a load range of PUCCH set3 and a load range of PUCCH set4 need to be combined into one load range, that is, when the load of the uplink control channel load belongs to the combined load range, one PUCCH resource is determined in PUCCH resource small group 42 according to the signaling information and/or predetermined rule indicated in the DCI, and the uplink control information is sent in the determined PUCCH resource; or the load range of PUCCH set3 and a load range of PUCCH set2 are combined into one load range, that is, when the load of the uplink control channel load belongs to the combined load range, one PUCCH resource is determined in PUCCH resource small group 22 according to the signaling information and/or predetermined rule indicated in the DCI, and the uplink control information is sent in the determined PUCCH resource.

Manner four for dividing the PUCCH resource group: a radio resource control (RRC) signaling informs PUCCH resources included in one PUCCH resource group, or an RRC command or a medium access control-control element (MAC-CE) command configures spatial-relation indication information for each PUCCH resource, and PUCCH resources with the same reference signal included in the spatial relation indication information form one PUCCH resource group.

There is an association relation between the PUCCH resource group and the downlink control channel resource group, and uplink control information scheduled by a control channel in one downlink control channel resource group is sent in the PUCCH resource group having an association relation with the downlink control channel resource group.

In the following embodiments, acquiring one piece of information according to the other information includes that one piece of information is equal to the other piece of information, or an acquisition parameter of one piece of information includes the other piece of information.

In the following embodiments, a frequency domain bandwidth includes at least one of a component carrier (CC), a bandwidth part (BWP), or one physical resource block (PRB) resource set.

In the following embodiments, one hybrid automatic repeat request-acknowledgement (HARQ-ACK) codebook includes HARQ-ACK bits of one or more physical downlink shared channels (PDSCHs). One HARQ-ACK codebook may also be referred to as one HARQ-ACK bit sequence, or one HARQ-ACK feedback codebook, or other names, which do not affect the protection scope of the present disclosure.

In the following embodiments, the resource includes one or more of the following resources: a time domain resource, a frequency domain resource, a code domain resource, and a spatial domain resource; a spatial domain resource of a downlink signal includes a quasi co-location reference signal of the downlink signal, and a spatial domain resource of an uplink signal includes a spatial transmit filter of the uplink signal or spatial relation indication information of the uplink signal.

In the following embodiments, a transmission channel and/or signal and/or information includes: when the method is applied to a sending end, the channel and/or signal and/or information is sent; and when the method is applied to a receiving end, the channel and/or signal and/or information is received.

Referring to FIG. 1, an embodiment of the present disclosure provides an information transmission method, and the information transmission method includes steps described below.

In step 100, second information corresponding to a hybrid automatic repeat request acknowledge (HARQ-ACK) codebook to be transmitted currently is determined; where the second information includes at least one of: a frequency domain bandwidth set, first information, or high-layer signaling information.

In the embodiments of the present disclosure, the frequency domain bandwidth set corresponding to the HARQ-ACK codebook to be transmitted currently is determined according to at least one of:

a control channel resource corresponding to the HARQ-ACK codebook to be transmitted currently, and a first correspondence between the control channel resource and the frequency domain bandwidth set; where the control channel resource includes at least one of: an uplink control channel resource or a downlink control channel resource;

a control channel resource group to which the control channel resource corresponding to the HARQ-ACK codebook to be transmitted currently belongs, and a second correspondence between the control channel resource group and the frequency domain bandwidth set;

a third correspondence between the HARQ-ACK codebook and the frequency domain bandwidth set;

a configuration situation of a first-type parameter set in a frequency domain bandwidth; or an activated frequency domain bandwidth in one frequency domain bandwidth group.

The control channel resource includes at least one of: an uplink control channel resource or a downlink control channel resource.

A downlink control channel resource corresponding to the HARQ-ACK codebook to be transmitted currently includes at least one of:

a downlink control channel resource for scheduling a physical downlink shared channel (PDSCH) corresponding to the HARQ-ACK codebook to be transmitted currently; a downlink control channel resource for scheduling an uplink channel resource where the HARQ-ACK codebook to be transmitted currently is located; or a downlink control channel resource for sending the second information corresponding to the HARQ-ACK codebook to be transmitted currently.

In the case where the frequency domain bandwidth set corresponding to the HARQ-ACK codebook to be transmitted currently is determined according to the configuration situation of the first-type parameter set in the frequency domain bandwidth, frequency domain bandwidths in the frequency domain bandwidth set satisfy at least one of the following features:

configuration information of the first-type parameter set corresponding to the HARQ-ACK codebook to be transmitted currently is configured in the frequency domain bandwidths; the frequency domain bandwidths are in the activated state; or the frequency domain bandwidths belong to one frequency domain bandwidth group.

In the case where the frequency domain bandwidths include the component carrier (CC), the configuration information of the first-type parameter set corresponding to the HARQ-ACK codebook to be transmitted currently in the CC includes one of:

the configuration information of the first-type parameter set corresponding to the HARQ-ACK codebook to be transmitted currently is configured in one BWP of the CC; or the configuration information of the first-type parameter set corresponding to the HARQ-ACK codebook to be transmitted currently is configured in an activated BWP of the CC.

In the embodiments of the present disclosure, the first information and/or the high-layer signaling include at least one of:

a time interval set between a PDSCH and an HARQ-ACK codebook corresponding to the PDSCH; a time domain resource set where the PDSCH is located; slot structure information; the maximum number of code block groups (CBGs) included in one transmission block (TB); whether HARQ-ACK feedback bits corresponding to two TBs or code words (CWs) of one PDSCH are subjected to the bundle operation; the maximum number of TBs or CWs included in one PDSCH; information for acquiring a candidate PDSCH set corresponding to the HARQ-ACK codebook to be transmitted currently; information for acquiring the number of HARQ-ACK bits included in the HARQ-ACK codebook to be transmitted currently; an aggregation factor of a PDSCH; or a parameter for a semi-persistent transmission PDSCH.

In the embodiments of the present disclosure, the step in which the second information corresponding to the HARQ-ACK codebook to be transmitted is determined includes steps described below:

a fourth correspondence between N types of HARQ-ACK codebooks and N sets of second information is determined; and the second information corresponding to the HARQ-ACK codebook to be transmitted currently is determined according to a type of the N types of HARQ-ACK codebooks to which the HARQ-ACK codebook to be transmitted currently belongs.

N is an integer greater than or equal to 2.

In the embodiments of the present disclosure, the fourth correspondence is determined according to at least one of the following information:

a control channel resource group to which a control channel resource corresponding to one type of HARQ-ACK codebook belongs, and a fifth correspondence between the control channel resource group and one set of second information; a sixth correspondence between one type of HARQ-ACK codebook and one set of second information; or the traffic type of the PDSCH corresponding to an HARQ-ACK codebook included in one type of HARQ-ACK codebook;

The one type of HARQ-ACK codebook belongs to the N types of HARQ-ACK codebooks.

The control channel resource includes at least one of: an uplink control channel resource or a downlink control channel resource.

The step in which an $i^{th}$ correspondence is determined includes that signaling information is transmitted, the signaling information includes the $i^{th}$ correspondence; and i is at least one of one, two, three, four, five or six.

In the embodiments of the present disclosure, the HARQ-ACK codebook to be transmitted currently belongs to one type of HARQ-ACK codebook in the N types of HARQ-ACK codebooks, and N is an integer greater than or equal to 2.

In the embodiments of the present disclosure, the N types of HARQ-ACK codebooks satisfy at least one of the following features:

uplink channels where the N types of HARQ-ACK codebooks are located fall in the same time unit;
an intersection among uplink channel resources where the N types of HARQ-ACK codebooks are located is empty, where the uplink channel includes at least one of a physical uplink control channel (PUCCH) or a physical uplink shared channel (PUSCH), and the resource includes at least one of a time domain resource or a frequency domain resource;
PUCCH resources where the N types of HARQ-ACK codebooks are located belong to different PUCCH resource groups respectively;
the N types of HARQ-ACK codebooks are associated with different group identifiers, where the different group identifiers are used for representing at least one of: different communication nodes, channels sent by different communication nodes, or signals sent by different communication nodes;
uplink channel resources where the N types of HARQ-ACK codebooks are located are in the same uplink frequency domain bandwidth;
the one type of HARQ-ACK codebook in one time unit includes M HARQ-ACK codebooks, and M is an integer greater than or equal to 1;
each type of HARQ-ACK codebook in the N types of HARQ-ACK codebooks corresponds to one set of second information, where one set of second information is one value of the second information; or, a configuration information set index is included in configuration information of each set of second information;
at least two types of HARQ-ACK codebooks exist, and a difference value among at least two sets of second information corresponding to the at least two types of HARQ-ACK codebooks is not 0 or a difference set among at least two sets of second information corresponding to the at least two types of HARQ-ACK codebooks is non-empty;
the N types of HARQ-ACK codebooks include the type-I HARQ-ACK codebook;
the N types of HARQ-ACK codebooks correspond to N types of PDSCHs; or
the N types of HARQ-ACK codebooks correspond to N control channel resource groups.

In the embodiments of the present disclosure, the N types of PDSCHs satisfy at least one of the following features:

the N types of PDSCHs include PDSCHs located in the same frequency domain bandwidth; the N types of PDSCHs include PDSCHs located in the same time unit; an intersection among resources occupied by the N types of PDSCHs is non-empty; different types of PDSCHs in the N types of PDSCHs are scheduled by control channels in different downlink control channel resource groups; the same type of PDSCH is scheduled by control channels in the same downlink control channel resource group; an intersection among resources occupied by more than one PDSCH belonging to the same type of PDSCH is empty; or an intersection among resources occupied by more than one PDSCH belonging to different types of PDSCHs is empty or non-empty.

The downlink control channel resource group satisfies one of the following features:

downlink control channel resources associated with the same set of configuration information of the first-type parameter set belong to one downlink control channel resource group;

in one or more frequency domain bandwidths, downlink control channel resources associated with the same set index of the first-type parameter set belong to one downlink control channel resource group, where the first-type parameter set associated with the same set index is configured in one or more frequency domain bandwidths; for example, PDSCH-cofig0 (i.e., the first set of the first-type parameter set) and PDSCH-cofig1 (i.e., the second set of the first-type parameter set) are in CC1 (such as, in one currently activated BWP in CC1), PDSCH-cofig0 is associated with {CORESET0, CORESET1}, PDSCH-cofig1 is associated with {CORESET2, CORESET3}, and in CC2 (such as, in one currently activated BWP in CC2), PDSCH-cofig0 is associated with {CORESET2, CORESET1}, PDSCH-cofig1 is associated with {CORESET0}; there is one CORESET group associated with the set index 0 of PDSCH-config, namely {(CORESET0, CORESET1) in CC1, (CORESET2, CORESET1) in CC2}, and there is one CORESET group associated with the set index 1 of PDSCH-config, namely {(CORESET2, CORESET3) in CC1, (CORESET0) in CC2}; or in response to not receiving division signaling information of the downlink control channel resource group, only one downlink control channel resource group exists.

In the embodiments of the present disclosure, a frequency domain bandwidth combination includes at least one of a component carrier (CC) combination or a bandwidth part (BWP) combination.

In the embodiments of the present disclosure, the N types of HARQ-ACK codebooks satisfy at least one of the following features:

in the case where a configured set number of the first-type parameter set in a first frequency domain bandwidth is P, P types of HARQ-ACK codebooks in the N types of HARQ-ACK codebooks include HARQ-ACK bits of a PDSCH in the first frequency domain bandwidth;

in the case where a configured set number of the first-type parameter set in a second frequency domain bandwidth is P and P is less than N, an intersection between the second frequency domain bandwidth and a frequency domain bandwidth set corresponding to Q types of HARQ-ACK codebooks in the N types of HARQ-ACK codebooks is empty, that is, the Q types of HARQ-ACK codebooks do not include HARQ-ACK bits of a PDSCH in the second frequency domain bandwidth; or in the case where configuration information of the first-type parameter set corresponding to one type of HARQ-ACK codebook is not included in a third frequency domain bandwidth, an intersection between a frequency domain bandwidth set corresponding to the one type of HARQ-ACK codebook and the third frequency domain bandwidth is empty, that is, the one type of HARQ-ACK codebook does not include HARQ-ACK bits of a PDSCH in the third frequency domain bandwidth.

Each of P and Q is a non-negative integer less than or equal to N; or Q is equal to (N-P).

The first-type parameter set includes at least one of the following parameter information:

process number set information, downlink data channel information, demodulation reference signal information, quasi co-location reference signal information, transmission configuration indication state (TCI state) list information, uplink data channel information, an uplink control channel resource group, rate matching information, measurement reference signal information, a generation parameter for a scrambling sequence, time advance information, aperiodic measurement reference signal information, power information, a downlink control channel resource group, downlink data channel information of a semi-persistent transmission, the first information, or mapping table information between an indication content and a value of a predetermined bit field in downlink control information (DCI).

The predetermined bit field in the DCI includes a bit field for indicating one of the following information: TCI, channel state information (CSI) request information, sounding reference signal (SRS) request information, or power adjustment information.

In step 101, the HARQ-ACK codebook to be transmitted currently is determined according to the determined second information.

In the embodiments of the present disclosure, the step in which the HARQ-ACK codebook to be transmitted currently is determined includes at least one of:

the number of HARQ-ACK bits included in the HARQ-ACK codebook to be transmitted currently is determined; or one of a TB, a CBG or a PDSCH corresponding to the HARQ-ACK bits in the HARQ-ACK codebook to be transmitted currently is determined.

In step 102, the determined HARQ-ACK codebook is transmitted.

In the embodiments of the present disclosure, the transmission includes at least one of sending or receiving.

According to the embodiments of the present disclosure, the HARQ-ACK feedback is realized based on the second information when the same UE is independently scheduled among multiple TRPs.

Figure 2:
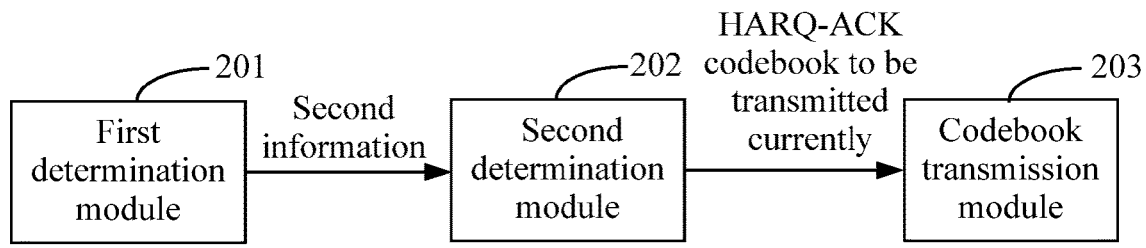
FIG. 2 is a schematic diagram of an information transmission device provided by another embodiment of the present disclosure.

Referring to FIG. 2, another embodiment of the present disclosure provides an information transmission device. The information transmission device includes a first determination module 201, a second determination module 202 and a codebook transmission module 203. The first determination module 201 is configured to determine second information corresponding to a hybrid automatic repeat request acknowledge (HARQ-ACK) codebook to be transmitted currently. The second determination module 202 is configured to determine the HARQ-ACK codebook to be transmitted currently according to the determined second information. The codebook transmission module 203 is configured to transmit the determined HARQ-ACK codebook. The second information includes at least one of: a frequency domain bandwidth set, first information, or high-layer signaling information.

In the embodiments of the present disclosure, the first determination module 201 is specifically configured to determine the frequency domain bandwidth set corresponding to the HARQ-ACK codebook to be transmitted currently in the following manner.

The frequency domain bandwidth set corresponding to the HARQ-ACK codebook to be transmitted currently is determined according to at least one of:

a control channel resource corresponding to the HARQ-ACK codebook to be transmitted currently, and a first correspondence between the control channel resource and the frequency domain bandwidth set; where the control channel resource includes at least one of: an uplink control channel resource or a downlink control channel resource;
a control channel resource group to which a control channel resource corresponding to the HARQ-ACK codebook to be transmitted currently belongs, and a second correspondence between the control channel resource group and the frequency domain bandwidth set;
a third correspondence between the HARQ-ACK codebook and the frequency domain bandwidth set;
a configuration situation of a first-type parameter set in a frequency domain bandwidth; or an activated frequency domain bandwidth in one frequency domain bandwidth group.

The control channel resource includes at least one of: an uplink control channel resource or a downlink control channel resource.

A downlink control channel resource corresponding to the HARQ-ACK codebook to be transmitted currently includes at least one of:
a downlink control channel resource for scheduling a physical downlink shared channel (PDSCH) corresponding to the HARQ-ACK codebook to be transmitted currently; a downlink control channel resource for scheduling an uplink channel resource where the HARQ-ACK codebook to be transmitted currently is located; or a downlink control channel resource for sending the second information corresponding to the HARQ-ACK codebook to be transmitted currently.

In the case where the first determination module 201 is configured to determine the frequency domain bandwidth set corresponding to the HARQ-ACK codebook to be transmitted currently according to the configuration situation of the first-type parameter set in the frequency domain bandwidth, frequency domain bandwidths in the frequency domain bandwidth set satisfy at least one of the following features:
configuration information of the first-type parameter set corresponding to the HARQ-ACK codebook to be transmitted currently is configured in the frequency domain bandwidths; the frequency domain bandwidths are in the activated state; or the frequency domain bandwidths belong to one frequency domain bandwidth group.

In the case where the frequency domain bandwidths include the component carrier (CC), the configuration information of the first-type parameter set corresponding to the HARQ-ACK codebook to be transmitted currently configured in the CC includes one of:
the configuration information of the first-type parameter set corresponding to the HARQ-ACK codebook to be transmitted currently is configured in one BWP of the CC; or the configuration information of the first-type parameter set corresponding to the HARQ-ACK codebook to be transmitted currently is configured in an activated BWP of the CC.

In the embodiments of the present disclosure, the first information and/or the high-layer signaling include at least one of:
a time interval set between a PDSCH and an HARQ-ACK codebook corresponding to the PDSCH; a time domain resource set where the PDSCH is located; slot structure information; the maximum number of code block groups (CBGs) included in one transmission block (TB); whether HARQ-ACK feedback bits corresponding to two TBs or code words (CWs) of one PDSCH are subjected to the bundle operation; the maximum number of TBs or CWs included in one PDSCH; information for acquiring a candidate PDSCH set corresponding to the HARQ-ACK codebook to be transmitted currently; information for acquiring the number of HARQ-ACK bits included in the HARQ-ACK codebook to be transmitted currently; an aggregation factor of a PDSCH; or a parameter for a semi-persistent transmission PDSCH.

In the embodiments of the present disclosure, determining the second information corresponding to the HARQ-ACK codebook to be transmitted currently includes steps described below:
a fourth correspondence between N types of HARQ-ACK codebooks and N sets of second information is determined; and the second information corresponding to the HARQ-ACK codebook to be transmitted currently is determined according to a type of the N types of HARQ-ACK codebooks to which the HARQ-ACK codebook to be transmitted currently belongs; where N is an integer greater than or equal to 2.

In the embodiments of the present disclosure, the first determination module 201 is specifically configured to determine the fourth correspondence according to at least one of the following information in the following manner:
a control channel resource group to which a control channel resource corresponding to one type of HARQ-ACK codebook belongs, and a fifth correspondence between the control channel resource group and one set of second information; a sixth correspondence between one type of HARQ-ACK codebook and one set of second information; or the traffic type of a PDSCH corresponding to an HARQ-ACK codebook included in one type of HARQ-ACK codebook;
The one type of HARQ-ACK codebook belongs to the N types of HARQ-ACK codebooks.

The control channel resource includes at least one of: an uplink control channel resource or a downlink control channel resource.

The first determination module 201 is specifically configured to determine an $i^{th}$ correspondence in the following manner:
transmitting signaling information, the signaling information includes the $i^{th}$ correspondence, and i is at least one of one, two, three, four, five or six.

In the embodiments of the present disclosure, the HARQ-ACK codebook to be transmitted currently belongs to one type of HARQ-ACK codebook in the N types of HARQ-ACK codebooks, and N is an integer greater than or equal to 2.

In the embodiments of the present disclosure, the N types of HARQ-ACK codebooks satisfy at least one of the following features:
uplink channels where the N types of HARQ-ACK codebooks are located fall in the same time unit;
an intersection among uplink channel resources where the N types of HARQ-ACK codebooks are located is empty, where the uplink channel includes at least one of a physical uplink control channel (PUCCH) or a physical uplink shared channel (PUSCH), and the resource includes at least one of a time domain resource or a frequency domain resource;
PUCCH resources where the N types of HARQ-ACK codebooks are located belong to different PUCCH resource groups respectively;
the N types of HARQ-ACK codebooks are associated with different group identifiers, where the different group identifiers are used for representing at least one of: different communication nodes, channels sent by different communication nodes, or signals sent by different communication nodes;

uplink channel resources where the N types of HARQ-ACK codebooks are located are in the same uplink frequency domain bandwidth;

one type of HARQ-ACK codebook in one time unit includes M HARQ-ACK codebooks, and M is an integer greater than or equal to 1;

each type of HARQ-ACK codebook in the N types of HARQ-ACK codebooks corresponds to one set of second information, where one set of second information is one value of the second information; or, a configuration information set index is included in configuration information of each set of second information;

at least two types of HARQ-ACK codebooks exist, and a difference value among at least two sets of second information corresponding to the at least two types of HARQ-ACK codebooks is not 0 or a difference set among at least two sets of second information corresponding to the at least two types of HARQ-ACK codebooks is non-empty;

the N types of HARQ-ACK codebooks include the type-I HARQ-ACK codebook;

the N types of HARQ-ACK codebooks correspond to N types of PDSCHs; or the N types of HARQ-ACK codebooks correspond to N control channel resource groups.

In the embodiments of the present disclosure, the N types of PDSCHs satisfy at least one of the following features:

the N types of PDSCHs include PDSCHs located in the same frequency domain bandwidth; the N types of PDSCHs include PDSCHs located in the same time unit; an intersection among resources occupied by the N types of PDSCHs is non-empty; different types of PDSCHs in the N types of PDSCHs are scheduled by control channels in different downlink control channel resource groups; the same type of PDSCH is scheduled by control channels in the same downlink control channel resource group; an intersection among resources occupied by more than one PDSCH belonging to the same type of PDSCH is empty; or an intersection among resources occupied by more than one PDSCH belonging to different types of PDSCHs is empty or non-empty.

The downlink control channel resource group satisfies one of the following features:

downlink control channel resources associated with the same set of configuration information of the first-type parameter set belong to one downlink control channel resource group;

in one or more frequency domain bandwidths, downlink control channel resources associated with the same set index of the first-type parameter set belong to one downlink control channel resource group, where the first-type parameter set associated with the same set index is configured in one or more frequency domain bandwidths; or in response to not receiving division signaling information of the downlink control channel resource group, only one downlink control channel resource group exists.

In the embodiments of the present disclosure, a frequency domain bandwidth combination includes at least one of a component carrier (CC) combination or a bandwidth part (BWP) combination.

In the embodiments of the present disclosure, the N types of HARQ-ACK codebooks satisfy at least one of the following features:

in the case where a configured set number of the first-type parameter set in a first frequency domain bandwidth is P, P types of HARQ-ACK codebooks in the N types of HARQ-ACK codebooks include HARQ-ACK bits of a PDSCH in the first frequency domain bandwidth; in the case where a configured set number of the first-type parameter set in a second frequency domain bandwidth is P and P is less than N, an intersection between a frequency domain bandwidth set corresponding to Q types of HARQ-ACK codebooks in the N types of HARQ-ACK codebooks and the second frequency domain bandwidth is empty, that is, the Q types of HARQ-ACK codebooks do not include HARQ-ACK bits of a PDSCH in the second frequency domain bandwidth; or in the case where configuration information of the first-type parameter set corresponding to one type of HARQ-ACK codebook is not included in a third frequency domain bandwidth, an intersection between a frequency domain bandwidth set corresponding to the one type of HARQ-ACK codebooks and the third frequency domain bandwidth is empty, that is, the one type of HARQ-ACK codebook does not include HARQ-ACK bits of a PDSCH in the third frequency domain bandwidth.

Each of P and Q is a non-negative integer less than or equal to N, or Q is equal to (N-P).

The first-type parameter set includes at least one of the following parameter information:

process number set information, downlink data channel information, demodulation reference signal information, quasi co-location reference signal information, transmission configuration indication state (TCI state) list information, uplink data channel information, an uplink control channel resource group, rate matching information, measurement reference signal information, a generation parameter for a scrambling sequence, time advance information, aperiodic measurement reference signal information, power information, a downlink control channel resource group, downlink data channel information of a semi-persistent transmission, the first information, or mapping table information between an indication content and a value of a predetermined bit field in downlink control information (DCI).

The predetermined bit field in the DCI includes a bit field for indicating one of the following information: TCI, channel state information (CSI) request information, sounding reference signal (SRS) request information, or power adjustment information.

In the embodiments of the present disclosure, the transmission includes at least one of sending or receiving.

In the embodiments of the present disclosure, the second determination module 202 is specifically configured to perform at least one of:

determining the number of HARQ-ACK bits included in the HARQ-ACK codebook to be transmitted currently; or determining one of a TB, a CBG or a PDSCH corresponding to the HARQ-ACK bits in the HARQ-ACK codebook to be transmitted currently.

According to the embodiments of the present disclosure, the HARQ-ACK feedback is realized based on the second information when the same UE is independently scheduled among multiple TRPs.

An implementation process of the information transmission device described above is the same as that of the information transmission method of the foregoing embodiment, which is not to be detailed herein again.

Another embodiment of the present disclosure provides an information transmission device. The information transmission device includes a processor and a computer-readable storage medium. The computer-readable storage medium stores an instruction, and when the instruction is executed by the processor, any one of the information transmission methods described above is implemented.

Another embodiment of the present disclosure provides a computer-readable storage medium. The computer-readable storage medium stores a computer program. When the computer program is executed by a processor, any one of the information transmission methods described above is implemented.

Embodiment One

Figure 3:
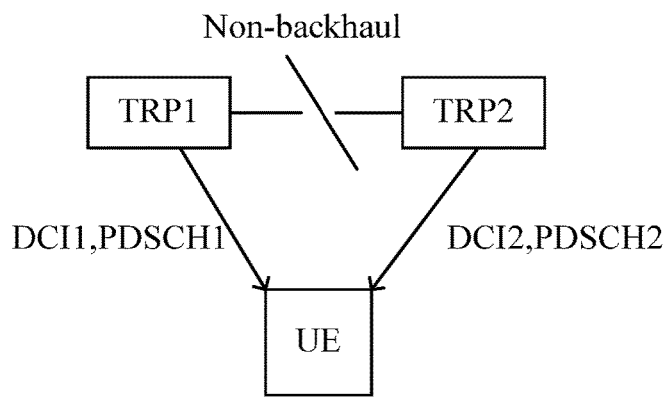
FIG. 3 is a schematic diagram illustrating independent scheduling of the same UE when there is no ideal backhaul (non-backhaul) between two TRPs according to an embodiment of the present disclosure.

In this embodiment, there is no ideal backhaul between two TRPs, and the two TRPs independently schedule the PDSCH, as shown in FIG. 3, there is no ideal backhaul between TRP1 and a TRP2, the TRP1 transmits DCI1 and a PDSCH1, the DCI1 schedules the PDSCH1, the TRP2 transmits DCI2 and a PDSCH2, the DCI2 schedules the PDSCH2, and an intersection between time domain resources and/or frequency domain resources occupied by the PDSCH1 and the PDSCH2 may be non-empty or empty. Because there is no ideal backhaul between the two TRPs, a certain delay is required for information interaction between these two TRPs, in order to well support the two TRPs to independently schedule the same UE, an HARQ-ACK of the PDSCH1 should be fed back to the TRP1, and an HARQ-ACK of the PDSCH2 should be fed back to the TRP 2. Namely, HARQ-ACKs of PDSCHs sent by the two TRPs are fed back to the corresponding TRPs respectively. For this purpose, two HARQ-ACK codebooks may be formed, an HARQ-ACK codebook 1 includes the HARQ-ACK of the PDSCH1 fed back to the TRP1, and an HARQ-ACK codebook 2 includes an HARQ-ACK of the PDSCH2 fed back to the TRP 2.

In the following description, DCIi may correspond to multiple pieces of DCI, i.e., the DCIi corresponds to one type of DCI, including multiple pieces of DCI sent by the same TRP, PDSCHi may correspond to multiple PDSCHs, i.e., the PDSCHi corresponds to one type of PDSCH, including multiple PDSCHs sent by the same TRP, and each type of DCI/PDSCH corresponds to one type of HARQ-ACK codebooks, i.e., the DCIi/PDSCHi corresponds to an HARQ-ACK codebook i, where the HARQ-ACK codebook i includes one or more HARQ-ACK codebooks, multiple HARQ-ACK codebooks correspond to multiple HARQ-ACK codebooks sent to the same TRP at different moments, or multiple HARQ-ACK codebooks correspond to multiple HARQ-ACK codebooks returned to the same TRP for different traffic types at the same moment. i is 1 or 2, and it is not excluded that i may be greater than 2.

In an acquisition process of one type-I HARQ-ACK codebook (also referred to as a semi-static codebook), a corresponding HARQ-ACK feedback bit sequence is formed for each CC; when a terminal is configured with 3 CCs (the 3 CCs belong to one CC group, such as one master cell group (MCG) or one secondary cell group (SCG), where the MCG group or the SCG group is a predetermined frequency domain bandwidth group), as shown in FIG. 4, a base station configures 3 CCs for the terminal, {3-bit HARQ-ACK feedback bits of CC1, 2-bit HARQ-ACK feedback bits of CC2, 4-bit HARQ-ACK feedback bits of CC3} are included in the HARQ-ACK codebook i, where i=1, 2. Actually, CC combinations (i.e., CC sets) for two TRPs to work are different, for example, the TRP1 sends the PDSCH to the terminal on {CC1, CC2, CC3}, and the TRP2 sends the PDSCH to the same terminal on {CC2, CC3}, in order to save the number of HARQ-ACK feedback bits and improve the HARQ-ACK feedback efficiency, the terminal should know the CC combination for each TRP to work while acquiring the type-I HARQ-ACK codebook, so that when the terminal feeds back the type-I HARQ-ACK codebook, the terminal only needs to feed back an HARQ-ACK bit for the CC combination for a corresponding TRP to work, for one CC on which the TRP does not work, an HARQ-ACK for a PDSCH of that CC does not need to be fed back because this TRP does not send PDSCH in this CC. As shown in FIG. 5, {3-bit HARQ-ACK feedback bits of CC1, 2-bit HARQ-ACK feedback bits of CC2, 4-bit HARQ-ACK feedback bits of CC3} are included in the HARQ-ACK codebook 1, and {2-bit HARQ-ACK feedback bits of CC2, 4-bit HARQ-ACK feedback bits of CC3} are included in the HARQ-ACK codebook 2.

The above is that different TRPs communicate with the same UE in different CC combinations (i.e., frequency domain bandwidth sets), similarly, different TRPs communicate with the same UE in different BWP combinations (i.e., frequency domain bandwidth sets), for example, the TRP1 communicates with a terminal 1 on any one of {BWP1, BWP2, BWP3} of the CC2. The TRP2 communicates with the terminal 1 on any one of {BWP2, BWP3} of CC2.

In an embodiment, there is only one activated BWP at one moment in one CC, when the BWP1 is activated in CC2, only the HARQ-ACK codebook 1 fed back to the TRP1 includes HARQ-ACK feedback bits of the PDSCH in CC2, and the HARQ-ACK codebook 2 fed back to TRP2 does not include the HARQ-ACK feedback bits of the PDSCH in CC2. When the BWP2 or the BWP3 is activated in CC2, both the HARQ-ACK codebook 1 and the HARQ-ACK codebook 2 include the HARQ-ACK feedback bits of the PDSCH in CC2. For example, when an activated BWP in the CC2 is the BWP1, a frequency domain bandwidth set corresponding to the HARQ-ACK codebook 1 includes {BWP1 in CC1, BWP1 in CC2, BWP1 in CC3}, and a frequency domain bandwidth set corresponding to the HARQ-ACK codebook 2 includes {BWP1 in CC3}. When an activated BWP in the CC2 is the BWP2, the frequency domain bandwidth set corresponding to the HARQ-ACK codebook 1 is {BWP2 in CC1, BWP2 in CC2, BWP2 in CC3}, and the frequency domain bandwidth set corresponding to the HARQ-ACK codebook 2 is {BWP2 in CC2, BWP2 in CC3}.

In order to achieve the above objects, at least one of the following schemes may be adopted.

Scheme 1: a correspondence (namely the first correspondence or the second correspondence) between a downlink control channel resource (or a downlink control channel resource group) and a CC combination and/or a BWP combination is determined through signaling information and/or a predetermined rule, for example, a correspondence exists between CORESET1 and {CC1, CC2, CC3}, a correspondence exists between CORESET2 and {CC2, CC3}, TRPi sends DCIi in CORESETi, the DCIi schedules a PDSCHi, the PDSCHi scheduled by the CORESETi is fed back in an HARQ-ACK codebook i, and the terminal acquires the HARQ-ACK codebook i according to the CC combination having a correspondence with the CORESETi, so that different types of HARQ-ACK codebooks may correspond to different CC combinations.

Scheme 2: a correspondence (i.e., the first correspondence or the second correspondence) between the PUCCH resource group and the CC combination and/or BWP combination is established, where different PUCCH resource groups correspond to different TRPs and also to different HARQ-ACK codebooks. For example, an HARQ-ACK codebook included in a PUCCH resource group 1 is acquired according to CC combination 1, and an HARQ-ACK codebook included in a PUCCH resource group 2 is acquired according to CC combination 2.

Scheme 3: a correspondence (i.e., the third correspondence) between the HARQ-ACK codebook and the CC combination and/or BWP combination is established, one HARQ-ACK codebook includes HARQ-ACK feedback bits of a PDSCH in the CC combination and/or BWP combination having a correspondence with the one HARQ-ACK codebook, and does not include HARQ-ACK feedback bits of a PDSCH in a CC combination/BWP combination having no correspondence with the one HARQ-ACK codebook.

Since more than one BWP may be included in one CC, the establishment of the first correspondence to the third correspondence in the above schemes 1 to 3 may be established in only one BWP, a correspondence configured in one BWP in one CC is applicable to all BWPs of the one CC, or it may be configured independently for each BWP in one CC, one or more correspondences of the first correspondence to the third correspondence are determined according to configuration information of a currently activated BWP.

When signaling information of the correspondence is not received, it is considered that the CC combination corresponding to each downlink control channel resource group/PUCCH resource group/HARQ-ACK codebook includes all CCs configured in one serving cell group and/or an activated CC set in one serving cell group corresponding to each downlink control channel resource group/PUCCH resource group/HARQ-ACK codebook, where one activated CC includes one CC in the activated state, or one CC including an activated BWP.

Scheme 4: the HARQ-ACK codebook is determined according to configuration information of the first-type parameter set configured in one CC or one BWP, for example, different sets of configuration information of the first-type parameter set correspond to different HARQ-ACK codebooks, for example, an $i^{th}$ set of configuration information of the first-type parameter set corresponds to an HARQ-ACK codebook i, where i=1, 2; when only one set of configuration information of the first-type parameter set exists in one CC, only one HARQ-ACK codebook includes HARQ-ACK feedback bits of a PDSCH in the CC, for example, the first set of configuration information of the first-type parameter set is configured in {CC1, CC2, CC3}, the second set of configuration information of the first-type parameter set is configured in {CC2, CC3}, and the second set of configuration information of the first-type parameter set is not configured in CC1, as shown in FIG. 5, the HARQ-ACK codebook 1 includes HARQ-ACK feedback bits of a PDSCH in {CC1, CC2, CC3}, and the HARQ-ACK codebook 2 includes HARQ-ACK feedback bits of a PDSCH in {CC2, CC3} and does not include HARQ-ACK feedback bits of a PDSCH in CC1, because the second set of configuration information of the first-type parameter set corresponding to the HARQ-ACK codebook 2 is not configured in CC1. In conclusion, multiple sets of configuration information of the first-type parameter set may be configured in one CC, and the configured set numbers of the first-type parameter set in different CCs may be different. Multiple sets of configuration information of the first-type parameter set configured in one CC include one set index of the first-type parameter set corresponding to one set of configuration information of the first-type parameter set configured in one CC, and set indexes of multiple first-type parameter sets are configured in one CC.

The first-type parameter set includes the downlink data channel information, and the downlink data channel information includes all information in the PDSCH-config or part of information in the PDSCH-config.

Alternatively, the first-type parameter set includes at least one of the following parameter information: process number set information, an uplink control channel resource group, demodulation reference signal port set information, demodulation reference signal information, quasi co-location reference signal set information, transmission configuration indication (TCI) state list information, downlink data channel information (for example, including PDSCH-config information or part of information included in the PDSCH-config), uplink data channel information, uplink control channel information (for example, including PUCCH-config information or part of information included in the PUCCH-config), precoding resource granularity (PRB bundling size) information, rate matching information, carrier indicator information, measurement reference signal information, a generation parameter for a scrambling sequence, timing advance (TA) information, port information of a control channel, aperiodic measurement reference signal information, power information, a downlink control channel resource group, the first information, downlink data channel information of a semi-persistent transmission, or mapping table information between a value of a predetermined bit field and an indication content in DCI, where the predetermined bit field in the DCI includes a bit field used for indicating one of the following information: TCI, CSI request information, SRS request information, or power adjustment information. Other parameter information is not excluded, generally, different TRPs correspond to different configuration information of the first-type parameter set. For example, the same bit field in the DCI in different CORESET groups corresponding to different TRPs refers to the mapping table between the value of the bit field and the indication content, such as a TCI indication field in DCI of the CORESET group 1 refers to a mapping table 1 (as shown in table 1-a), and a TCI indication field in DCI of the CORESET group 2 refers to a mapping table 2 (as shown in table 1-b).

In an embodiment, when the first-type parameter set includes the downlink control channel resource group, multiple CCs scheduled by the downlink control channel resource group are all included in an HARQ-ACK codebook corresponding to the downlink control channel resource group. For example, a CORESET group 1 and a CORESET group 2 are configured in CC1, the CORESET group 1 corresponds to the first-type of HARQ-ACK codebook, the CORESET group 2 corresponds to the second-type of HARQ-ACK codebook, and downlink control channels in the CORESET group 1 may schedule downlink control channels in {CC1, CC2, CC3}, and downlink control channels in the CORESET group 2 may schedule downlink control channels in {CC2, CC3}, then the first-type of HARQ-ACK codebook includes an HARQ-ACK of the PDSCH in {CC1, CC2, CC3}, and the second-type of HARQ-ACK codebook includes an HARQ-ACK of the PDSCH in {CC2, CC3} and do not include an HARQ-ACK of the PDSCH in CC1.

TABLE 1-a

| Value of the TCI bit field | Indicated TCI content |
| --- | --- |
| 000 | TCI state 10 |
| 001 | TCI state 11 |
| ... | ... |
| 111 | TCI state 17 |

TABLE 1-b

| Value of the TCI bit field | Indicated TCI content |
| --- | --- |
| 000 | TCI state 20 |
| 001 | TCI state 21 |
| ... | ... |
| 111 | TCI state 27 |

For example, the first-type parameter set is the downlink data channel information, PDSCH-config, and PDSCH-configi corresponding to the HARQ-ACK codebook i, and the PDSCH is configured in one CC.

In an embodiment, configuration situation of the configuration information of the first-type parameter set configured in one CC or the first correspondence to the third correspondence are determined in one of the following manners: the configuration situation or the first correspondence to the third correspondence are determined according to configuration situation of configuration information of the first-type parameter set configured in the currently activated BWP in the CC; the configured set number of the first-type parameter set in the CC is determined according to the maximum value of numbers of sets of configuration information of the first-type parameter sets configured in all BWPs included in the CC; the first correspondence to the third correspondence are determined according to configuration information of the first-type parameter set configured in one BWP included in the CC, where the correspondence is configured in only one BWP in the CC. The configured set number of the first-type parameter set may also be referred to as the set number of the first-type parameter sets.

In the above embodiments, the HARQ-ACK codebook 1 and the HARQ-ACK codebook 2 satisfy at least one of the following features: the two HARQ-ACK codebooks fall in the same time unit; an intersection between PUCCH resources and/or PUSCH resources where the two HARQ-ACK codebooks are located is empty, where the resource includes at least one of a time domain resource or a frequency domain resource; the PUCCH resources where the two HARQ-ACK codebooks are located belong to different PUCCH resource groups respectively; the two HARQ-ACK codebooks are associated with different group identifications, where the different group identifications are used for representing different TRPs and/or channels and/or signals sent by different TRPs; and the PUCCH resources and/or PUSCH resources where the two HARQ-ACK codebooks are located are in the same uplink BWP.

In an embodiment, the two HARQ-ACK codebooks correspond to two types of PDSCHs, the two types of PDSCHs satisfy at least one of the following features: the two types of PDSCHs include PDSCHs located in the same frequency domain bandwidth; the two types of PDSCHs include PDSCHs located in the same time unit; an intersection between resources occupied by the two types of PDSCHs is non-empty; the two types of PDSCHs are scheduled by control channels in different downlink control channel resource groups; the same type of PDSCH is scheduled by control channels in the same downlink control channel resource group; an intersection among resources occupied by more than one PDSCH belonging to the same type of PDSCH is empty; an intersection among resources occupied by more than one PDSCH belonging to different types of PDSCHs is empty or non-empty. Namely, an intersection of resources occupied by PDSCHs sent by the same TRP is empty, and an intersection of resources occupied by PDSCHs sent by different TRPs may be empty or non-empty.

The above embodiments are exemplified by using two TRPs and two HARQ-ACK codebooks, this embodiment does not exclude more than two TRPs and more than two HARQ-ACK codebooks.

Embodiment Two

In this embodiment, a correspondence exists (i.e., the fourth correspondence) between the HARQ-ACK codebook and the first information. The first information includes at least one of: a time interval set between the PDSCH and the HARQ-ACK codebook; a time interval set between DCI for scheduling a PDSCH and the PDSCH; an aggregation factor of a PDSCH; a time domain resource set where the PDSCH is located; a slot structure; the maximum number of code block groups (CBGs) included in one transmission block (TB); whether HARQ-ACK feedback bits corresponding to two TBs or code words (CWs) of one PDSCH are subjected to the bundle operation, the maximum number of TBs/CWs included in one PDSCH; a parameter for a semi-persistent transmission PDSCH; information for acquiring a candidate PDSCH set corresponding to the HARQ-ACK codebook to be transmitted currently; or information for acquiring the number of HARQ-ACK bits included in the HARQ-ACK codebook to be transmitted currently.

In an embodiment, the time interval set between the PDSCH and the HARQ-ACK codebook is $K_1$, the time interval set $K_1$ between the PDSCH and the HARQ-ACK codebook is obtained by high-layer signaling and/or a pre-determined rule, and DCI scheduling one PDSCH indicates that a time interval between the one PDSCH and the HARQ-ACK codebook of this PDSCH is which value in $K_1$. For example, the HARQ-ACK codebook in an uplink slot (n) includes HARQ-ACK information of a PDSCH in a downlink slot (n−$k_1$) corresponding to each value $k_1$ in the time interval set $K_1$ corresponding to the HARQ-ACK codebook.

A time interval set between the DCI and the PDSCH is $k_0$, the time interval set $k_0$ between the DCI and the PDSCH is obtained through the high-layer signaling and/or the predetermined rule, and DCI scheduling one PDSCH indicates that a time interval between the DCI and the PDSCH is which value in $k_0$.

One time domain resource includes time domain symbol set information occupied by one PDSCH in one slot, a time domain resource set where the PDSCH is located is obtained according to the high-layer signaling information and/or the predetermined rule, and the DCI scheduling one PDSCH indicates which one in the time domain resource set is the time domain resource of the PDSCH. Time domain resources in the time domain resource set are divided into one or more time domain resource groups according to the predetermined rule, one HARQ-ACK codebook includes HARQ-ACKs of a PDSCH/TB/CBG in each time domain resource group, and one time domain resource group may only correspond to one PDSCH (or a limited number of PDSCHs) in one HARQ-ACK codebook. That is, the terminal expects to receive only one PDSCH (or the limited number of PDSCHs) in one time domain resource group corresponding to one HARQ-ACK codebook.

A parameter for the semi-persistent transmission PDSCH (also referred to as the high-layer configured PDSCH transmission) include at least one of: a transmission period of the PDSCH, an HARQ-ACK process number set, or an uplink control channel resource where an HARQ-ACK of the semi-persistent transmission PDSCH is located, and HARQ-ACK bits of a semi-persistent transmission PDSCH corresponding to each HARQ-ACK codebook are obtained according to the parameter for the semi-persistent transmission PDSCH corresponding to each HARQ-ACK codebook.

A time slot structure includes information of a downlink time domain symbol set, an uplink time domain symbol set, and a flexible time domain symbol set included in one slot. If at least one time domain symbol exists in each slot occupied by one PDSCH, the time slot structure indicates that the time domain symbol is an uplink transmission time domain symbol.

The case that the first information is the maximum number of CBGs included in one TB includes that when the HARQ-ACK is fed back, one HARQ-ACK bit is fed back for each CBG in each TB. In other words, each CBG of one TB in the HARQ-ACK codebook has a corresponding HARQ-ACK bit.

When the aggregation factor of the PDSCH is greater than 1, the PDSCH is repeatedly transmitted in the aggregation number of consecutive slots, and for the PDSCH repeatedly transmitted in the aggregation number of slots, the HARQ-ACK codebook of the PDSCH is included in only one HARQ-ACK codebook.

In the case where HARQ-ACK feedback bits corresponding to two TBs/CWs of one PDSCH are subjected to the bundle operation, when the HARQ-ACK is fed back, one HARQ-ACK feedback bit corresponding to the HARQ-ACK bits of the two TBs/CWs is subjected to the binary operation; otherwise, the HARQ-ACK feedback bit corresponding to the two TB/CWs of one PDSCH is not subjected to the bundle operation, when the HARQ-ACK is fed back, the two TBs/CWs correspond to one HARQ-ACK bit respectively.

In an embodiment, there are at least two HARQ-ACK feedback codebooks, which correspond to PDSCHs sent by different TRPs respectively, such as PDSCHs scheduled by DCI in different control channel resource groups in one BWP. Each HARQ-ACK codebook corresponds to one set of configuration information of the first information respectively, such as the first set of configuration information of the first information corresponding to the HARQ-ACK codebook 1 and the second set of configuration information of the first information corresponding to the HARQ-ACK codebook 2.

Therefore, different TRPs may correspond to different first information described above, and the flexibility of the first information among TRPs is realized. On the other hand, when the HARQ-ACK codebook is acquired, especially when the type-I HARQ-A-CK feedback codebook is acquired, the HARQ-ACK feedback bits included in the HARQ-ACK codebook are determined according to the first information corresponding to the HARQ-ACK codebook. In conclusion, different HARQ-ACK codebooks may correspond to different HARQ-ACK feedback bits of the same CC/same BWP, and may correspond to different the candidate PDSCH sets. One candidate PDSCH corresponds to one or more HARQ-ACK feedback bits in one HARQ-ACK codebook, and the number of HARQ-ACK feedback bits corresponding to one candidate PDSCH in one HARQ-ACK codebook is acquired according to at least one of the following information: the maximum number of CBGs corresponding to the PDSCH, whether to perform the bundle operation between two TB s/CWs, or the maximum number of TB s/CWs included in one PDSCH.

Figures 7, 8, 9:
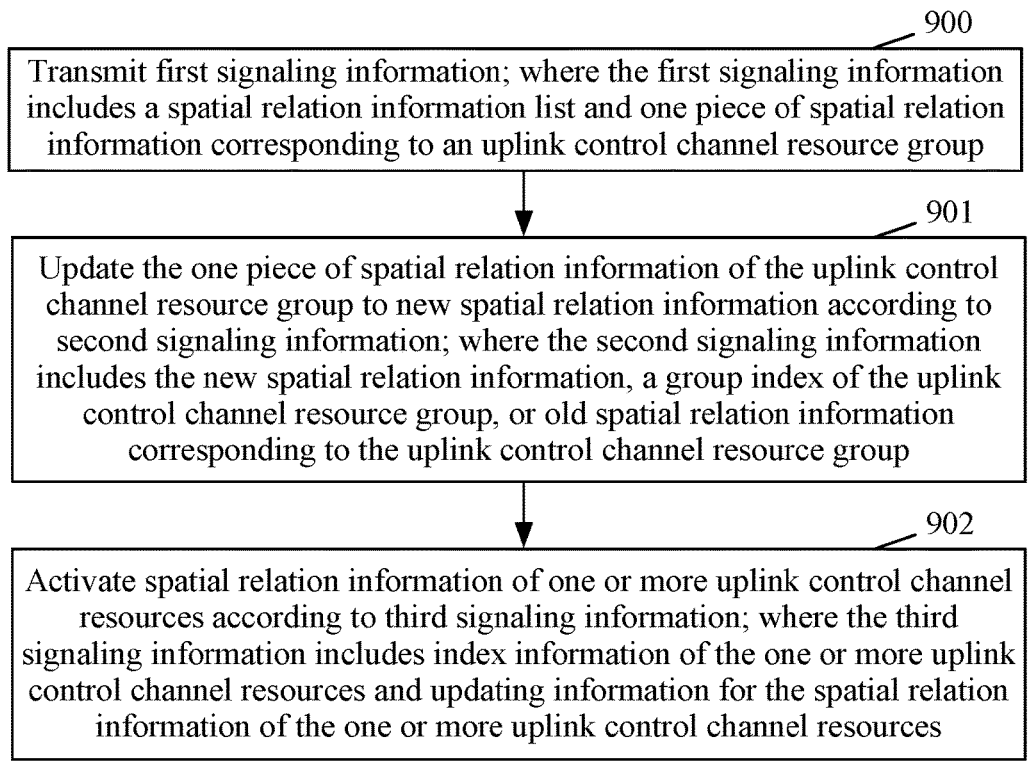
FIG. 7 is a schematic diagram illustrating different bit structures of different types of HARQ-ACK codebooks when the different types of HARQ-ACK codebooks of a TRP correspond to different configuration information of first information according to an embodiment of the present disclosure.
FIG. 8 is a schematic diagram illustrating acquisition of a spatial transmit filter for a PUCCH resource according to a quasi co-location reference signal which is associated with a predetermined-type quasi co-location parameter in an activated quasi co-location reference signal set of a CORE-SET and in a time unit where the PUCCH resource is located according to an embodiment of the present disclosure.
FIG. 9 is a flowchart illustrating a method for updating a spatial relation provided by another embodiment of the present disclosure.

The effect shown in FIG. 7 may be achieved through different configuration information of the first information corresponding to different HARQ-ACK codebooks described above, where the HARQ-ACK codebook 1 is fed back to the TRP1, the HARQ-ACK codebook 2 is fed back to the TRP2, and the number of HARQ-ACK feedback bits corresponding to the same CC or the same BWP in different HARQ-ACK codebooks may be different. Even if the number of feedback bits is the same, candidate PDSCHs corresponding to HARQ-ACK feedback bits at the same position may be different.

The establishment of the correspondence between the above HARQ-ACK codebook and the first information may be acquired in at least one of the following manners.

Correspondence acquisition manner one: the correspondence between the HARQ-ACK codebook and the first information is directly acquired through the signaling information and/or the predetermined rule. For example, the signaling information includes the first information corresponding to the HARQ-ACK codebook.

In an embodiment, one uplink BWP includes two types of HARQ-ACK codebooks, and the first information corresponding to each type of HARQ-ACK codebook may be configured independently. The signaling information establishes the correspondence between the two types of HARQ-ACK codebooks and two sets of configuration information of the first information.

In an embodiment, when it is considered that multi-TRP transmission is combined with enhanced mobile broadband (eMBB) traffic and ultra-reliable and low latency communications (URLLC) traffic, one type of HARQ-ACK codebook may include more than one HARQ-ACK codebook in one BWP of one slot, different HARQ-ACK codebooks correspond to the eMBB traffic and the URLLC traffic respectively, that is, different types of HARQ-ACK codebooks correspond to PDSCHs transmitted by different TRPs, and different HARQ-ACK codebooks in one type of HARQ-ACK codebook corresponds to different traffic types, the eMBB traffic and the URLLC traffic may be distinguished by explicit signaling or by an implicit mode, such as a scrambling sequence of DCI, a mapping mode type A or a mapping mode type B of the PDSCH, and other implicit distinguishing modes are not excluded.

Correspondence acquisition manner two: a correspondence between the control channel resource group and the first information is acquired through the signaling information and/or the predetermined rule, and the first information corresponding to the HARQ-ACK codebook is acquired according to the control channel resource group corresponding to the HARQ-ACK codebook. For example, the first information corresponding to the HARQ-ACK codebook is first information corresponding to a control channel resource group having a correspondence with the HARQ-ACK codebook, and the control channel resource group includes a downlink control channel resource group and an uplink control channel resource group.

In an embodiment, the downlink control channel resource group corresponding to the one type of HARQ-ACK codebook includes one of: a downlink control channel resource group to which a downlink control channel resource belongs and a PDCCH of a PDSCH corresponding to one HARQ-ACK codebook in the one type of HARQ-ACK codebook is located in the downlink control channel resource; a downlink control channel resource group to which a downlink control channel resource scheduling an uplink channel where the one type of HARQ-ACK codebook is located belongs; or a downlink control channel resource group to which the downlink control channel resource sending the first information corresponding to the one type of HARQ-ACK belongs.

In an embodiment, one or more sets of configuration information of the first information are included in one CC/one BWP.

Another embodiment of the present disclosure provides an information determination method. The information determination method includes steps described below: group information is determined, and third information is determined according to the group information; or group information is determined according to third information.

The group information includes at least one of: downlink control channel resource group information, antenna group information, or measurement reference signal resource group information.

The third information includes at least one of the following information:
a seventh correspondence between the group information and a fourth-type parameter set; quasi co-location reference signal information of a channel and/or signal; where a time interval between a control channel scheduling the channel and/or signal and the channel and/or signal is less than a predetermined threshold; a merging of uplink control information (UCI); an uplink channel where the UCI is located; a channel and/or signal to which one piece of downlink control information is applicable; or a monitoring of a downlink control channel; a maximum number of different quasi co-location reference signals associated with spatial receive parameters of B channels and/or signals, where an intersection among time domain resources occupied by the B channels and/or signals is non-empty; the maximum number of spatial transmit filters of H channels and/or signals, where an intersection among time domain resources occupied by the H channels and/or signals is non-empty; an eighth correspondence between the group information and a channel and/or signal; or a monitoring of downlink control information in a predetermined format, where the predetermined format includes at least one of: downlink control information DCI2_0, DCI2_1, DCI2_2, or DCI2_3, where each of B and H is an integer greater than 1.

In the embodiments of the present disclosure, the downlink control channel resource group includes one or more downlink control channel resources. An implementation is also not excluded in which each downlink control channel resource group includes only one downlink control channel resource, that is, one downlink control channel resource is one downlink control channel resource group. The case that the numbers of downlink control channel resources included in different downlink control channel resource groups are different is not excluded in this embodiment.

In the embodiments of the present disclosure, a group index is included in the group information. A correspondence between the group information and other information includes a correspondence between the group index and other information, and determining the other information according to the group information includes that the other information is determined according to the group index.

In the embodiments of the present disclosure, the step in which the seventh correspondence is determined according to the group information, or the group information is determined according to the seventh correspondence includes at least one of:
channels and/or signals associated with the same group information correspond to the same set of the fourth-type parameter set; or channels and/or signals which are associated with the same group information and belong to one frequency domain bandwidth correspond to the same set of configuration information of the fourth-type parameter set;

channels and/or signals associated with different group information correspond to different sets of configuration information of the fourth-type parameter set; or channels and/or signals which are associated with different group information and belong to one frequency domain bandwidth correspond to different sets of configuration information of the fourth-type parameter set in the one frequency domain bandwidth;

an association relation between C sets of configuration information of the fourth-type parameter set and C pieces of group information in one frequency domain bandwidth is determined;

the number of groups included in the group information is the same as the number of sets of configuration information of the fourth-type parameter set; or a value of a predetermined-type parameter in the second set of configuration information in the fourth-type parameter set is acquired according to a value of the predetermined-type parameter in the first set of configuration information in the fourth-type parameter set, where the predetermined-type parameter includes one or more types of parameters, the value of the predetermined-type parameter is not configured in the second set of configuration information, the value of the predetermined-type parameter is configured in the first set of configuration information, and C is an integer greater than or equal to 1.

The channels and/or signals associated with one downlink control channel resource group includes at least one of: control channels for scheduling channels and/or signals belong to the one downlink control channel resource group; channels and/or signals whose fourth-type parameter set is sent by a control channel in the one downlink control channel resource group; or channels and/or signals whose scheduling information is included in a channel and/or signal scheduled by a downlink control channel of the one downlink control channel resource group.

In the embodiments of the present disclosure, determining the quasi co-location reference signal information of the channel and/or signal according to the downlink control channel resource group includes:
the quasi co-location reference signal information of the channel and/or signal is acquired according to a quasi co-location reference signal set which has a predetermined downlink control channel resource index in a time unit latest to the channel and/or signal and is in a downlink control channel resource group where a control channel scheduling the channel and/or signal is located.

In the embodiments of the present disclosure, determining the merging of the uplink control information according to the group information or determining the group information according to the merging of the uplink control information includes at least one of:

E pieces of uplink control information associated with the same group information are sent by merging the E pieces of uplink control information into one uplink channel resource; where the one uplink channel resource includes at least one of an uplink control channel resource (such as PUCCH) or an uplink data channel resource (such as PUSCH); or an intersection of uplink channel resources occupied by F pieces of uplink control information associated with different group information is empty.

E and F are integers greater than 1; and the E pieces of uplink control information are fed back in the same time unit; and/or an intersection among E uplink channel resources corresponding to the E pieces of uplink control information is non-empty.

In the embodiments of the present disclosure, determining the uplink channel where the uplink control information is located according to the group information includes at least one of:

when the uplink control information and the uplink channel are associated with the same group information, the uplink control information is sent in the uplink channel; when the uplink control information and the uplink channel are associated with different group information, the uplink control information cannot be sent in the uplink channel; a reporting resource of one piece of uplink control information includes more than one PUCCH resource associated with different group information; or a reporting resource of one piece of uplink control information includes more than one PUCCH resource associated with different group information in one BWP.

In the embodiments of the present disclosure, determining the range of the channel and/or signal to which one piece of downlink control information is applicable according to the downlink control channel resource group information includes at least one of:

information included in the one piece of downlink control information is applicable to a channel and/or signal corresponding to a downlink control channel resource group corresponding to the downlink control information; or information included in the one piece of downlink control information is not applicable to a channel and/or signal corresponding to a downlink control channel resource group having no correspondence with the downlink control information.

The downlink control channel resource group corresponding to the downlink control information includes: a downlink control channel resource group to which a downlink control channel resource where the downlink control information is located belongs, or a downlink control channel resource group which is determined according to signaling information and has a correspondence with the downlink control information.

The channel and/or signal corresponding to the downlink control channel resource group includes at least one of: a channel and/or signal scheduled by a downlink control channel in the downlink control channel resource group, a downlink control channel in the downlink control channel resource group, or a channel and/or signal whose scheduling information is included in a channel and/or signal scheduled by a downlink control channel of the downlink control channel resource group.

In the embodiments of the present disclosure, determining the monitoring of the downlink control channel according to the group information includes at least one of:

the total number of downlink control channels monitored in one time unit is determined according to the number of groups included in the group information; or an allocation of monitored downlink control channels is determined according to the group information.

The total number of the downlink control channels monitored in one time unit is to be in direct proportion to the number of groups included in the group information.

Only downlink control channels in M downlink control channel resource groups among N downlink control channel resource groups include predetermined information. The predetermined information includes at least one of: information for scheduling an aperiodic measurement reference signal, indication information for indicating a slot format indicator (SFI), or information for indicating a BWP switching; M is an integer less than N and greater than or equal to 1, and N is an integer greater than 1.

When an intersection among resources occupied by X downlink control channel resource groups is non-empty, determining the monitoring of the downlink control channel according to the group information includes one of: monitoring a downlink control channel in Y downlink control channel resource groups; monitoring a downlink control channel of Y downlink control channel resource groups at an intersection part; or monitoring a downlink control channel in the X downlink control channel resource groups; where scrambling sequences of downlink control channels in different downlink control channel resource groups are different, Y is an integer less than X and greater than or equal to 1, and X is an integer greater than 1.

In the embodiments of the present disclosure, determining the maximum number of different quasi co-location reference signals associated with spatial receive parameters of the B channels and/or signals according to the group information includes one of:

the number of groups included in the group information is in direct proportion to the maximum number of the different quasi co-location reference signals; or the number of groups included in the group information is greater than or equal to the maximum number of the different quasi co-location reference signals.

In the embodiments of the present disclosure, determining the maximum number of different spatial transmit filters of the H channels and/or signals occupying the time domain resources occupied with a non-empty intersection according to the group information includes one of:

the number of groups included in the group information is in direct proportion to the maximum number of different spatial transmit filters; or the number of groups included in the group information is greater than or equal to the maximum number of different spatial transmit filters.

In the embodiments of the present disclosure, determining the eighth correspondence between the group information and the channel and/or signal according to the group information includes at least one of:

a spatial transmit filter of an uplink signal is acquired according to a quasi co-location reference signal which is associated with a predetermined quasi co-location parameter and in a quasi co-location reference signal set of a downlink control channel resource in a downlink control channel resource group;

a quasi co-location reference signal in a quasi co-location reference signal set of a downlink control channel resource in a downlink control channel resource group is acquired according to a reference signal included in spatial relation information of an uplink signal;

an uplink signal is sent through an antenna in an antenna group;

signaling information is transmitted, where the signaling information includes the eighth correspondence between the uplink signal and the group information; or when the eighth correspondence between an uplink signal and the group information has not been received, all control channel resources in one frequency domain bandwidth belong to one control channel resource group; or there is only one antenna group.

In the embodiments of the present disclosure, acquiring the spatial transmit filter of the uplink signal according to the quasi co-location reference signal associated with the predetermined quasi co-location parameter in the quasi co-location reference signal set of the downlink control channel resource in the downlink control channel resource group includes at least one of:

the spatial transmit filter of the uplink signal is acquired according to an activated quasi co-location reference signal in a time domain resource occupied by the uplink signal, where the activated quasi co-location reference signal associated with the predetermined quasi co-location parameter is in a quasi co-location reference signal set of a downlink control channel resource having a correspondence with the uplink signal; or in the case where a quasi co-location reference signal of the downlink control channel is updated, the spatial transmit filter of the uplink signal is updated accordingly. The downlink control channel resource is a downlink control channel resource in the downlink control channel resource group and satisfies a predetermined feature in a time unit latest to the uplink signal; and the uplink signal includes an uplink control channel signal.

The downlink control channel resource group includes one or more downlink control channel resources, such as a downlink control channel resource satisfying a predetermined feature. The predetermined feature includes at least one of:

feature one: the downlink control channel resource is associated with at least one candidate control channel or search space to be monitored in the time unit; feature two: a control channel resource index of the downlink control channel resource is a lowest index in the downlink control channel resource group; feature three: at least one downlink control channel is monitored in the downlink control channel resource; feature four: the downlink control channel resource includes a downlink control channel for scheduling a predetermined channel and/or signal; where the predetermined channel and/or signal includes at least one of: an uplink control channel resource, or a physical downlink shared channel (PDSCH) corresponding to a hybrid automatic repeat request acknowledge (HARQ-ACK) included in the uplink control channel resource; or feature five: the downlink control channel resource includes a downlink control channel for scheduling channel state information (CSI); where the CSI is included in the uplink control channel resource.

In the embodiments of the present disclosure, determining the monitoring of the downlink control information in the predetermined format according to the group information includes at least one of:

each downlink control channel resource group includes the downlink control information in the predetermined format; transmission directions for the same time domain symbol of the same CC in DCI2_0 sent by more than one downlink control channel resource group are consistent; in the case where a third-type parameter set of one frequency domain bandwidth corresponding to one downlink control channel resource group is not configured, an SFI which corresponds to the one frequency domain bandwidth and is in DCI2_0 sent by the downlink control channel resource group is ignored; or the downlink control information in the predetermined format is sent by only one downlink control channel resource group.

In the embodiments of the present disclosure, determining the monitoring of the downlink control information in the predetermined format according to the group information includes at least one of:

each downlink control channel resource group includes the downlink control information in the predetermined format; transmission directions for the same time domain symbol of the same CC in DCI2_0 sent by more than one downlink control channel resource group are consistent; in the case where a third-type parameter set of one frequency domain bandwidth corresponding to one downlink control channel resource group is not configured, an SFI which corresponds to the one frequency domain bandwidth and is in DCI2_0 sent by the downlink control channel resource group is ignored; or the downlink control information in the predetermined format is sent by only one downlink control channel resource group.

In the embodiments of the present disclosure, determining the group information includes at least one of:

downlink control channel resources associated with the same set of configuration information of a third-type parameter set belong to one downlink control channel resource group; antennas associated with the same set of configuration information of a third-type parameter set belong to one antenna group; in one frequency domain bandwidth, the number of groups included in the group information is less than or equal to the number of sets of configuration information of a third-type parameter set; a difference set of parameter types included in a third-type parameter set and the fourth-type parameter set is non-empty; downlink control channel resources associated with the same set index of configuration information of a third-type parameter set in L frequency domain bandwidths belong to one downlink control channel resource group, where L is an integer greater than or equal to 1, the index of configuration information may also be referred as a set index or an index of a set of configuration information of the third-type parameter set; the group information is determined according to signaling information; or in the case where signaling information divided by the group information is not received, all downlink control channel resources in only one group or one frequency domain bandwidth belong to one downlink control channel resource group; and the antenna group includes a receive antenna group or a transmit antenna group.

In the embodiments of the present disclosure, the fourth-type parameter set and/or the third-type parameter set include at least one of the following parameters:

process number set information, uplink control channel resource set information, demodulation reference signal port set information, demodulation reference signal information, quasi co-location reference signal set information, transmission configuration indication state list information, downlink data channel information, uplink data channel information, uplink control channel information, precoding resource granularity physical resource block (PRB) binding size information, rate matching information, carrier indicator information, measurement reference signal information, a generation parameter for a scrambling sequence, time advance (TA) information, port information of a control channel, a time domain resource allocation parameter, a frequency domain resource allocation parameter, aperiodic measurement reference signal information, power information, a downlink control channel resource group, an uplink signal, configuration information of a semi-persistent transmission data channel, a high-layer configuration parameter of the downlink control information in the predetermined format, or mapping table information between an indication content and a value of a predetermined bit field in DCI.

The predetermined bit field in the DCI includes a bit field used for indicating one of the following information: TCI, channel state information (CSI) request information, sounding reference signal (SRS) request information, or power adjustment information.

In the embodiments of the present disclosure, determining the eighth correspondence between the group information and the channel and/or signal includes determining the eighth correspondence between N pieces of group information and N types of channels and/or signals; where different types of channels and/or signals have correspondences with different group information; at least one of the following features is satisfied among the N types of channels and/or signals:

an intersection among resources occupied by a $j^{th}$ type of channel and/or signal and an $i^{th}$ type of channel and/or signal is empty; in the case where an intersection among resources occupied by a $j^{th}$ type of measurement reference signal and an $i^{th}$ type of measurement reference signal is non-empty, a reference signal sequence corresponding to the $i^{th}$ type of measurement reference signal is different from a reference signal sequence corresponding to the $j^{th}$ type of measurement reference signal; in the case where an intersection between an $i^{th}$ type of downlink measurement reference signal and a $j^{th}$ type of channel and/or signal is non-empty, the reporting of channel state information corresponding to the $i^{th}$ type of downlink measurement reference signal is abandoned, or intersection information is included in channel state information corresponding to the $i^{th}$ type of downlink measurement reference signal; an intersection among resources occupied by more than one data channel belonging to the same type of data channel is empty; or an intersection among resources occupied by more than one data channel belonging to different types of data channels is empty or non-empty; where i is not equal to j, both i and j belong to $\{1, 2, \ldots, N\}$, and N is an integer greater than or equal to 2.

The intersection among the resources occupied by the $j^{th}$ type of channel and/or signal and the $i^{th}$ type of channel and/or signal being empty includes at least one of:

an intersection among resources in a $j^{th}$ type of aperiodic-channel state information-reference signal (AP-CSI-RS) resource pool and an $i^{th}$ type of downlink data channel is empty; an intersection between an $i^{th}$ type of downlink data channel and a $j^{th}$ type of control channel is empty; an intersection between an $i^{th}$ type of demodulation reference signal and a $j^{th}$ type of measurement reference signal is empty; an intersection between an $i^{th}$ type of AP-CSI-RS and a $j^{th}$ type of AP-CSI-RS is empty; an intersection among resources in a $j^{th}$ type of aperiodic SRS resource pool and an $i^{th}$ type of uplink data channel is non-empty; or an intersection between an $i^{th}$ type of aperiodic SRS resource pool and a $j^{th}$ type of aperiodic SRS resource pool is empty.

The intersection being empty includes one of: an intersection of resources which are occupied by the $i^{th}$ type of channel and/or signal and the $j^{th}$ type of channel and/or signal and configured by the base station for the terminal cannot be non-empty; when the intersection of the resources occupied by the $i^{th}$ type of channel and/or signal and the $j^{th}$ type of channel and/or signal and configured by the base station for the terminal is non-empty, only one type of the $i^{th}$ type and $j^{th}$ type of channel and/or signal may be transmitted; when the intersection of the resources which are occupied by the $i^{th}$ type of channel and/or signal and the $j^{th}$ type of channel and/or signal and configured by the base station for the terminal is non-empty, one type of channel and/or signal performs rate matching on the intersection, that is, the two types of channels and/or signals are both transmitted, and only one type of channel and/or signal among the two types is transmitted in the intersection part.

Another embodiment of the present disclosure provides an information determination device. The information determination device includes a third determination module. The third determination module is configured to determine group information and determine third information according to the group information, or determine group information according to third information. The group information includes at least one of: downlink control channel resource group information, antenna group information, or measurement reference signal resource group information.

The third information includes at least one of the following information:

a seventh correspondence between the group information and a fourth-type parameter set; quasi co-location reference signal information of a channel and/or signal; where a time interval between a control channel scheduling the channel and/or signal and the channel and/or signal is less than a predetermined threshold; a merging of uplink control information; an uplink channel where the uplink control information is located; a channel and/or signal to which one piece of downlink control information is applicable; or a monitoring of a downlink control channel; the maximum number of different quasi co-location reference signals associated with spatial receive parameters of B channels and/or signals, where an intersection among time domain resources occupied by the B channels and/or signals is non-empty; the maximum number of spatial transmit filters of H channels and/or signals, where an intersection among time domain resources occupied by the H channels and/or signals is non-empty; an eighth correspondence between the group information and a channel and/or signal; or a monitoring of downlink control information in a predetermined format, where the predetermined format includes at least one of: downlink control information DCI2_0, DCI2_1, DCI2_2, or DCI2_3, and each of B and H is an integer greater than 1.

In the embodiments of the present disclosure, the downlink control channel resource group includes one or more downlink control channel resources. An implementation is also not excluded in which each downlink control channel resource group includes only one downlink control channel resource, that is, one downlink control channel resource is one downlink control channel resource group. The case that the numbers of downlink control channel resources included in different downlink control channel resource groups are different is not excluded in this embodiment.

In the embodiments of the present disclosure, the third determination module is specifically configured to determine the seventh correspondence according to the group information, or determine the group information according to the seventh correspondence in at least one of the following manners:

channels and/or signals associated with the same group information to correspond to the same set of the fourth-type parameter set; or channels and/or signals which are associated with the same group information and belong to one frequency domain bandwidth correspond to the same set of configuration information of the fourth-type parameter set;

channels and/or signals associated with different group information correspond to different sets of configuration information of the fourth-type parameter set; or channels and/or signals which are associated with different group information and belong to one frequency domain bandwidth correspond to different sets of configuration information of the fourth-type parameter set in the one frequency domain bandwidth;

an association relation between C sets of configuration information of the fourth-type parameter set and C pieces of group information in one frequency domain bandwidth is determined;

the number of groups included in the group information is the same as the number of sets of configuration information of the fourth-type parameter set;

a value of a predetermined-type parameter in a second set of configuration information in the fourth-type parameter set is acquired according to a value of the predetermined-type parameter in a first set of configuration information in the fourth-type parameter set, where the predetermined-type parameter includes one or more types of parameters, the value of the predetermined-type parameter is not configured in the second set of configuration information, the value of the predetermined-type parameter is configured in the first set of configuration information, and C is an integer greater than or equal to 1.

The channels and/or signals associated with one downlink control channel resource group include at least one of: control channels for scheduling the channels and/or signals belong to the one downlink control channel resource group; channels and/or signals whose fourth-type parameter set is sent by a control channel in the one downlink control channel resource group; or channel and/or signals whose scheduling information is included in a channel and/or signal scheduled by a downlink control channel of the one downlink control channel resource group.

In the embodiments of the present disclosure, the third determination module is specifically configured to determine the quasi co-location reference signal information of the channel and/or signal according to the downlink control channel resource group in the following manner:

the quasi co-location reference signal information of the channel and/or signal is acquired according to a quasi co-location reference signal set which has a predetermined downlink control channel resource index in a time unit latest to the channel and/or signal and is in a downlink control channel resource group where a control channel scheduling the channel and/or signal is located.

In the embodiments of the present disclosure, the third determination module is specifically configured to determine the merging of the uplink control information according to the group information, or determine the group information according to the merging of the uplink control information in the following manner.

E pieces of uplink control information associated with the same group information are sent by merging the E pieces of uplink control information into one uplink channel resource; where the one uplink channel resource includes at least one of an uplink control channel resource (such as PUCCH) or an uplink data channel resource (such as PUSCH).

An intersection of uplink channel resources occupied by F pieces of uplink control information associated with different group information is empty.

E and F are integers greater than 1; and the E pieces of uplink control information are fed back in the same time unit; and/or an intersection among E uplink channel resources corresponding to the E pieces of uplink control information is non-empty.

In the embodiments of the present disclosure, the third determination module is specifically configured to determine the uplink channel where the uplink control information is located according to the group information in at least one of the following manners.

When the uplink control information and the uplink channel are associated with the same group information, the uplink control information is sent in the uplink channel.

When the uplink control information and the uplink channel are associated with different group information, the uplink control information is not sent in the uplink channel.

One reporting resource of one piece of uplink control information includes more than one physical uplink control channel (PUCCH) resource associated with different group information; or one reporting resource of one piece of uplink control information includes more than one PUCCH resource associated with different group information in one bandwidth part (BWP).

In the embodiments of the present disclosure, the third determination module is specifically configured to determine the range of the channel and/or signal to which one piece of downlink control information is applicable according to the downlink control channel resource group information in at least one of the following manners.

Information included in the one piece of downlink control information is applicable to a channel and/or signal corresponding to a downlink control channel resource group corresponding to the downlink control information; or information included in the one piece of downlink control information is not applicable to a channel and/or signal corresponding to a downlink control channel resource group which has no correspondence with the downlink control information.

The downlink control channel resource group corresponding to the downlink control information includes: a downlink control channel resource group to which a downlink control channel resource where the downlink control information is located belongs, or a downlink control channel resource group which is determined according to signaling information and has a correspondence with the downlink control information.

The channel and/or signal corresponding to the downlink control channel resource group includes at least one of: a channel and/or signal scheduled by a downlink control channel in the downlink control channel resource group, a downlink control channel in the downlink control channel resource group, or a channel and/or signal whose scheduling information is included in a channel and/or signal scheduled by a downlink control channel of the downlink control channel resource group.

In the embodiments of the present disclosure, the third determination module is specifically configured to determine the monitoring of the downlink control channel according to the group information in at least one of the following manners.

The total number of downlink control channels monitored in one time unit is determined according to the number of groups included in the group information.

An allocation of monitored downlink control channels is determined according to the group information.

The total number of the downlink control channels monitored in the one time unit is in direct proportion to the number of groups included in the group information.

Only downlink control channels in M downlink control channel resource groups among N downlink control channel resource groups include predetermined information, where the predetermined information includes at least one of: information for scheduling an aperiodic measurement reference signal, indication information for indicating a slot format indicator (SFI), or information for indicating a BWP switching; M is an integer less than N and greater than or equal to 1, and N is an integer greater than 1.

In the case where an intersection among resources occupied by X downlink control channel resource groups is non-empty, determining the monitoring of the downlink control channel includes one of: monitoring a downlink control channel in Y downlink control channel resource groups; monitoring a downlink control channel of Y downlink control channel resource groups at an intersection part; or monitoring a downlink control channel in the X downlink control channel resource groups; where scrambling sequences of downlink control channels in different downlink control channel resource groups are different, Y is an integer less than X and greater than or equal to 1, and X is an integer greater than 1.

In the embodiments of the present disclosure, the third determination module is specifically configured to determine the maximum number of different quasi co-location reference signals associated with spatial receive parameters of the B channels and/or signals according to the group information in at least one of the following manners.

The number of groups included in the group information is in direct proportion to the maximum number of the different quasi co-location reference signals; or the number of groups included in the group information is greater than or equal to the maximum number of the different quasi co-location reference signals.

In the embodiments of the present disclosure, the third determination module is specifically configured to determine the maximum number of different spatial transmit filters of the H channels and/or signals according to the group information in one of the following manners, where the intersection among the time domain resources occupied by the H channels and/or signals is non-empty.

The number of groups included in the group information is in direct proportion to the maximum number of different spatial transmit filters; or the number of groups included in the group information is greater than or equal to the maximum number of different spatial transmit filters.

In the embodiments of the present disclosure, the third determination module is specifically configured to determine the eighth correspondence between the group information and the channel and/or signal according to the group information in one of the following manners.

A spatial transmit filter of an uplink signal is acquired according to a quasi co-location reference signal which is associated with a predetermined quasi co-location parameter and in a quasi co-location reference signal set of a downlink control channel resource in a downlink control channel resource group.

A quasi co-location reference signal in a quasi co-location reference signal set of downlink control channel resources in a downlink control channel resource group is acquired according to a reference signal included in spatial relation information of an uplink signal.

An uplink signal is sent through an antenna in an antenna group.

Signaling information is transmitted, and the signaling information includes the eighth correspondence between an uplink signal and the group information.

In the case where the eighth correspondence between an uplink signal and the group information is not received, all control channel resources in one frequency domain bandwidth belong to one control channel resource group; or there is only one antenna group.

In the embodiments of the present disclosure, the third determination module is specifically configured to acquire the spatial transmit filter of the uplink signal according to the quasi co-location reference signal associated with the predetermined quasi co-location parameter in the quasi co-location reference signal set of the downlink control channel resource in the downlink control channel resource group in at least one of the following manners.

The spatial transmit filter of the uplink signal is acquired according to an activated quasi co-location reference signal in a time domain resource occupied by the uplink signal, where the activated quasi co-location reference signal associated with the predetermined quasi co-location parameter is in a quasi co-location reference signal set of a downlink control channel resource having a correspondence with the uplink signal; or in the case where a quasi co-location reference signal of the downlink control channel is updated, the spatial transmit filter of the uplink signal is updated accordingly. The downlink control channel resource is a downlink control channel resource which is in the downlink control channel resource group and satisfies a predetermined feature in a time unit latest to the uplink signal; and the uplink signal includes an uplink control channel signal.

The downlink control channel resource group includes one or more downlink control channel resources.

The downlink control channel resource satisfies a predetermined feature. The predetermined feature includes at least one of:

feature one: the downlink control channel resource is associated with at least one candidate control channel or search space to be monitored in the time unit; feature two: a control channel resource index of the downlink control channel resource is a lowest index in the downlink control channel resource group; feature three: at least one downlink control channel is monitored in the downlink control channel resource; feature four: the downlink control channel resource includes a downlink control channel for scheduling a predetermined channel and/or signal; where the predetermined channel and/or signal includes at least one of: an uplink control channel resource, or a physical downlink shared channel (PDSCH) which corresponding to a hybrid automatic repeat request acknowledge (HARQ-ACK) included in the uplink control channel resource; or feature five: the downlink control channel resource includes a downlink control channel for scheduling channel state information (CSI); where the CSI is included in the uplink control channel resource.

In the embodiments of the present disclosure, the third determination module is specifically configured to determine the monitoring of the downlink control information in the predetermined format according to the group information in at least one of the following manners.

Each downlink control channel resource group includes the downlink control information in the predetermined format; transmission directions for the same time domain symbol of the same CC in the DCI2_0 sent in more than one downlink control channel resource group are consistent; in the case where a third-type parameter set of one frequency domain bandwidth corresponding to one downlink control channel resource group is not configured, an SFI indication corresponding to the one frequency domain bandwidth in the DCI2_0 sent in the downlink control channel resource group is ignored; or the downlink control information in the predetermined format is sent in only one downlink control channel resource group.

In the embodiments of the present disclosure, the third determination module is specifically configured to determine the monitoring of the downlink control information in the predetermined format according to the group information in at least one of the following manners.

Each downlink control channel resource group includes the downlink control information in the predetermined format; transmission directions for the same time domain symbol of the same CC in the DCI2_0 sent in more than one downlink control channel resource group are consistent; in the case where a third-type parameter set of one frequency domain bandwidth corresponding to one downlink control channel resource group is not configured, an SFI indication corresponding to the one frequency domain bandwidth in the DCI2_0 sent in the downlink control channel resource group is ignored; or the downlink control information in the predetermined format is sent in only one downlink control channel resource group.

In the embodiments of the present disclosure, the third determination module is specifically configured to determine the group information in at least one of the following manners.

Downlink control channel resources associated with the same set of configuration information of a third-type parameter set belong to one downlink control channel resource group; antennas associated with the same set of configuration information of a third-type parameter set belong to one antenna group; in one frequency domain bandwidth, the number of groups included in the group information is less than or equal to the number of sets of configuration information of a third-type parameter set; a difference set of parameter types included in a third-type parameter set and the fourth-type parameter set is non-empty; downlink control channel resources associated with the same set index of configuration information of a third-type parameter set in L frequency domain bandwidths belong to one downlink control channel resource group. L is an integer greater than or equal to 1, the index of configuration information may also be referred to as a set index or an index of a set of configuration information of the third-type parameter set. The group information is determined according to signaling information; or in the case where signaling information divided by the group information is not received, all downlink control channel resources in only one group or one frequency domain bandwidth belong to one downlink control channel resource group. The antenna group includes a receive antenna group or a transmit antenna group.

In the embodiments of the present disclosure, the fourth-type parameter set and/or the third-type parameter set include at least one of the following parameters:

process number set information, uplink control channel resource set information, demodulation reference signal port set information, demodulation reference signal information, quasi co-location reference signal set information, transmission configuration indication state list information, downlink data channel information, uplink data channel information, uplink control channel information, precoding resource granularity physical resource block (PRB) binding size information, rate matching information, carrier indicator information, measurement reference signal information, a generation parameter for a scrambling sequence, time advance (TA) information, port information of a control channel, a time domain resource allocation parameter, a frequency domain resource allocation parameter, aperiodic measurement reference signal information, power information, a downlink control channel resource group, an uplink signal, configuration information of a semi-persistent transmission data channel, a high-layer configuration parameter of the downlink control information in the predetermined format, or mapping table information between an indication content and a value of a predetermined bit field in DCI.

The predetermined bit field in the DCI includes a bit field used for indicating one of the following information: TCI, channel state information (CSI) request information, sounding reference signal (SRS) request information, or power adjustment information.

In the embodiments of the present disclosure, determining the eighth correspondence between the group information and the channel and/or signal includes determining the eighth correspondence between N pieces of group information and N types of channels and/or signals; where different types of channels and/or signals have correspondences with different group information; at least one of the following features is satisfied among the N types of channels and/or signals:

an intersection among resources occupied by a $j^{th}$ type of channel and/or signal and an $i^{th}$ type of channel and/or signal is empty; when an intersection among resources occupied by a $j^{th}$ type of measurement reference signal and an $i^{th}$ type of measurement reference signal is non-empty, a reference signal sequence corresponding to the $i^{th}$ type of measurement reference signal is different from a reference signal sequence corresponding to the $j^{th}$ type of measurement reference signal; in the case where an intersection between an $i^{th}$ type of downlink measurement reference signal and a $j^{th}$ type of channel and/or signal is non-empty, the reporting of channel state information corresponding to the $i^{th}$ type of downlink measurement reference signal is abandoned, or intersection information is included in channel state information corresponding to the $i^{th}$ type of downlink measurement reference signal; an intersection among resources occupied by more than one data channel belonging to the same type of data channel is empty; or an intersection among resources occupied by more than one data channel belonging to different types of data channels is empty or non-empty; where i is not equal to j, both i and j belong to $\{1, 2, \ldots, N\}$, and N is an integer greater than or equal to 2.

The intersection among the resources occupied by the $j^{th}$ type of channel and/or signal and the $i^{th}$ type of channel and/or signal being empty includes at least one of:

an intersection among resources in a $j^{th}$ type of aperiodic-channel state information-reference signal (AP-CSI-RS) resource pool and an $i^{th}$ type of downlink data channel is empty; an intersection between an $i^{th}$ type of downlink data channel and a $j^{th}$ type of control channel is empty; an intersection between an $i^{th}$ type of demodulation reference signal and a $j^{th}$ type of measurement reference signal is empty; an intersection between an $i^{th}$ type of AP-CSI-RS and a $j^{th}$ type of AP-CSI-RS is empty; an intersection among resources in a $j^{th}$ type of aperiodic SRS resource pool and an $i^{th}$ type of uplink data channel is empty; or an intersection between an $i^{th}$ type of aperiodic SRS resource pool and a $j^{th}$ type of aperiodic SRS resource pool is empty.

The intersection being empty includes one of: an intersection of resources occupied by $i^{th}$ type of channel and/or signal and $j^{th}$ type of channel and/or signal configured by the base station for the terminal cannot be non-empty; when the intersection of the resources occupied by the $i^{th}$ type of channel and/or signal and the $j^{th}$ type of channel and/or signal configured by the base station for the terminal is non-empty, only one type of the $i^{th}$ type and $j^{th}$ type of channels and/or signals may be transmitted; when the intersection of the resources occupied by the $i^{th}$ type of channel and/or signal and the $j^{th}$ type of channel and/or signal configured by the base station for the terminal is non-empty, one type of the $i^{th}$ type and $j^{th}$ type of channels and/or signals are subjected to the rate matching on the intersection, that is, the two types of channels and/or signals are both transmitted, and only one type of channel and/or signal in the two types is transmitted in the intersection part.

An implementation process of the information determination device described above is the same as that of the information determination method of the foregoing embodiment, which is not to be detailed herein again.

Another embodiment of the present disclosure provides an information determination device. The information determination device includes a processor and a computer-readable storage medium. The computer-readable storage medium stores an instruction, and when the instruction is executed by the processor, any one of the information determination methods described above is implemented.

Another embodiment of the present disclosure provides a computer-readable storage medium. The computer-readable storage medium stores a computer program. When the computer program is executed by a processor, any one of the information determination methods described above is implemented.

Embodiment Three

In this embodiment, a method for determining a downlink control channel resource group is provided. The method includes that the downlink control channel resource group is determined according to the correspondence between the downlink control channel resource and the third-type parameter set.

In an embodiment, downlink control channel resources associated with the same set of configuration information of the third-type parameter set belong to the same downlink control channel resource group. For example, one BWP has 3 CORESETs, CORESET0 and CORESET1 are associated with PDSCH-config0, and CORESET3 and CORESET4 are associated with PDSCH-config1, then {CORESET0, CORESET1} belong to a downlink control channel resource group 1, and {CORESET3, CORESET4} belong to a downlink control channel resource group 2. The third-type parameter set described above is PDSCH information included in the PDSCH-config. The third-type parameter set including other parameter types is not excluded in this embodiment.

In an embodiment, downlink control channel resources associated with the same set of configuration information of the third-type parameter set in the same frequency domain bandwidth belong to the same downlink control channel resource group. Alternatively, downlink control channel resources with the same configuration information index (i.e., the set index of configuration information) associated with the third-type parameter set in multiple CCs belong to one downlink control channel resource group, for example, {CORESET0, CORESET1} in CC1 are associated with PDSCH-config0 in CC1, and {CORESET3, CORESET4} in CC1 are associated with PDSCH-config1 in CC1; {CORESET1, CORESET2} in CC2 are associated with PDSCH-config0 in CC2, and {CORESET0} in CC1 is associated with PDSCH-config0 in CC2, a downlink control channel resource group 0 includes {(CORESET0, CORESET1) in CC1, (CORESET1, CORESET2) in CC2} since these CORESETs are associated with the PDSCH-config having the set index of 0 in respective CCs. A downlink control channel resource group 1 includes {(CORESET3, CORESET4) in CC1, (CORESET0) in CC2} since these CORESETs are associated with the PDSCH-config having the set index of 1 in respective CCs.

In an embodiment, the third information is determined according to the determined downlink control channel resource group, and the third information includes at least one of the following information: a correspondence between the downlink control channel resource group and a fourth-type parameter set; quasi co-location reference signal information of a channel and/or signal, where a time interval between a control channel scheduling the channel and/or signal and the channel and/or signal is less than a predetermined threshold; a merging of uplink control information (UCI); an uplink channel where the UCI is located; a channel and/or signal to which one piece of downlink control information is applicable; a monitoring of a candidate control channel; a maximum number of different quasi co-location reference signals associated with spatial receive parameters of B channels and/or signals, where an intersection among time domain resources occupied by the B channels and/or signals is non-empty; a maximum number of spatial transmit filters of H channels and/or signals, where an intersection among time domain resources occupied by the H channels and/or signals is non-empty; an eighth correspondence between the group information and an uplink signal; a monitoring of downlink control information with a predetermined; where the predetermined format includes one or more of DCI2_0, DCI2_1, DCI2_2, DCI2_3. and B and H are positive integers greater than 1. In addition, other information being acquired according to the downlink control channel resource group is not excluded in this embodiment, and it may be understood that different downlink control channel resource groups correspond to different TRPs, and there is no ideal backhaul among different TRPs, or the downlink control channel resource group is determined according to the above information.

In an embodiment, determining the correspondence between the downlink control channel resource group and the fourth-type parameter set according to the determined downlink control channel resource group includes: acquiring the fourth-type parameter set of the channel and/or signal scheduled by a control channel in one downlink control channel resource group according to a set of configuration information of the third-type parameter set corresponding to the one downlink control channel resource group.

In an embodiment, determining the quasi co-location reference signal information of the channel and/or signal according to the downlink control channel resource group includes: acquiring the quasi co-location reference signal information of the channel and/or signal according to a quasi co-location reference signal set of the lowest downlink control channel resource index in the time unit latest to the channel and/or signal in a downlink control channel resource group where the control channel scheduling the channel and/or signal is located.

In an embodiment, determining the merging of the UCI according to the downlink control channel resource group includes: merging UCI associated with the same downlink control channel resource group into one piece of UCI, the merged UCI is sent in one PUCCH/PUSCH resource, and/or, UCI associated with different downlink control channel resource groups cannot be merged into one piece of UCI and sent in one PUCCH/PUSCH resource.

In an embodiment, determining the uplink channel where the UCI is located according to the downlink control channel resource group includes that: when the UCI and the PUCCH/PUSCH are associated with the same downlink control channel resource group, the UCI may be sent in the PUCCH/PUSCH; the UCI is merged into one piece of UCI and sent in one PUCCH/PUSCH resource, and/or when the UCI and the PUCCH/PUSCH are associated with different downlink control channel resource groups, the UCI cannot be sent in the PUCCH/PUSCH.

In an embodiment, determining the range of the channel and/or signal to which the one piece of downlink control information is applicable according to the downlink control channel resource group includes that: information included in one piece of downlink control information is applicable to a channel and/or signal corresponding to a downlink control channel resource group corresponding to the one piece of downlink control information; and the information included in the one piece of downlink control information is not applicable to a channel and/or signal corresponding to the downlink control channel resource group having no correspondence with the one piece of downlink control information. For example, the information notified in DCI2_0, DCI2_1, DCI2_2, and DCI2_3 is applicable to the channel and/or signal scheduled by a CORESET group having the correspondence with the DCI2_0/DCI2_1/DCI2_2/DCI2_3, or the scheduling information is included in the PDSCH scheduled by a downlink control channel in the CORESET group 1. Alternatively, the PDSCH scheduled by the PDCCH in the downlink control channel group 1 includes an MAC-CE (namely, one type of the downlink control information), and the information notified in the MAC-CE command is applicable to a channel and/or signal scheduled by a downlink channel in the downlink control channel group 1. The downlink control information described above includes one or more of the following control information: DCI, MAC-CE and RRC control information.

In an embodiment, the downlink control channel resource group corresponding to the downlink control information includes a downlink control channel resource group to which the downlink control channel resource in which the downlink control information is located belongs, or a downlink control channel resource group which has a correspondence with the downlink control information and is determined according to the signaling information, for example, a downlink control channel resource group corresponding to DCI2_0/DCI2_1/DCI2_2/DCI2_3/MAC-CE/RRC notified in the signaling information. For example, DCI2_0/DCI2_1/DCI2_2/DCI2_3/MAC-CE/RRC corresponds to {CORESET0, CORESET1}, then control information notified in DCI2_0/DCI2_1/DCI2_2/DCI2_3/MAC-CE/RRC is applicable to a channel and/or signal scheduled by {CORESET0, CORESET1}.

In an embodiment, the channel and/or signal corresponding to the downlink control channel resource group includes at least one of: a channel and/or a signal (PDSCH/AP-CSI-RS scheduled by a PDCCH) scheduled by a downlink control channel in the downlink control channel resource group, and a downlink control channel in the downlink control channel resource group, a channel and/or signal whose scheduling information is included in a channel and/or signal scheduled by a downlink control channel of the downlink control channel resource group (for example, MAC-CE/RRC signaling for scheduling a periodic/semi-periodic/semi-persistent channel and/or signal is included in a PDSCH scheduled by a PDCCH).

In an embodiment, determining the monitored candidate control channel according to the determined downlink control channel resource group includes that: the total number of the monitored candidate control channels is determined according to the number of the determined downlink control channel resource groups, for example, greater the number of the downlink control channel resource groups is, greater the total number of the monitored candidate control channels is; an allocation of monitored candidate control channels is determined according to the number of the determined downlink control channel resource groups, for example, monitored candidate control channels are allocated into the downlink control channel resource groups according to a proportion; the number of downlink control channel resource groups is proportional to the total number of candidate control channels monitored in one time unit.

In an embodiment, determining, according to the determined downlink control channel resource group, the maximum number of the different quasi co-location reference signals associated with the spatial receive parameter of the B channels and/or signals whose intersection among the occupied time domain resources is non-empty includes that: the number of the downlink control channel resource groups is in direct proportion to the maximum number of the quasi co-location reference signals, for example, the maximum number of the quasi co-location reference signals is less than or equal to the number of the downlink control channel resource groups. For example, the maximum number of quasi co-location reference signals associated with spatial receive parameters of a channel and/or signal falling at one moment (such as, one time domain symbol or one slot or a time domain symbol with an intersection among the time domain symbols, such as different BWPs of different CCs) cannot exceed the number of downlink control channel resource groups. Exemplary, an intersection of time domain resources occupied by {PDSCH1, PDCCH1, AP-CSI-RS2, PDSCH2} is non-empty, then the maximum number of different quasi co-location reference signals associated with spatial receive parameters in {PDSCH1, PDCCH1, AP-CSI-RS2, PDSCH2} cannot exceed the number of downlink control channel resource groups; for example, the number of the downlink control channel resource groups is 2, then the quasi co-location reference signal associated with the spatial receive parameter of the PDSCH1 is a reference signal 1, the quasi co-location reference signal associated with the spatial receive parameter of the PDCCH1 is the reference signal 1, the quasi co-location reference signal associated with the spatial receive parameter of the AP-CSI-RS2 is a reference signal 2, and the quasi co-location reference signal associated with the spatial receive parameter of the PDSCH2 is a reference signal 2. If the quasi-co-location reference signal associated with the spatial receive parameter of the PDSCH1 is the reference signal 1, the quasi-co-location reference signal the associated spatial receive parameter of the PDCCH1 is the reference signal 2, the quasi-co-location reference signal associated with the spatial receive parameter of the AP-CSI-RS2 is the reference signal 3, and the quasi-co-location reference signal associated with the spatial receive parameter of the PDSCH2 is the reference signal 2, at this time, the number of different quasi co-location reference signals associated with spatial receive parameters in {PDSCH1, PDCCH1, AP-CSI-RS2, PDSCH2} is 3, namely {the reference signal 1, the reference signal 2, the reference signal 3}, the intersection of the time domain resources occupied by {PDSCH1, PDCCH1, AP-CSI-RS2, PDSCH2} needs to be non-empty, or a part of the {PDSCH1, PDCCH1, AP-CSI-RS2, PDSCH2} needs to be abandoned, so as to make the number of different quasi co-location reference signals associated with spatial receive parameters to be equal to 2. For example, the AP-CSI-RS2 is abandoned, then the number of different quasi co-located reference signals associated with spatial receive parameters in {PDSCH1, PDCCH1, PDSCH2} is 2, i.e., {the reference signal 1, the reference signal 2}.

In an embodiment, determining the maximum number of different spatial transmit filters of H channels and/or signals according to the determined downlink control channel resource group, where the intersection among time domain resources occupied by the H channels and/or signals being non-empty, includes that: the number of downlink control channel resource groups is in direct proportion to the maximum number of different spatial transmit filters, or the maximum number of the different spatial transmit filters is less than or equal to the number of the downlink control channel resource groups. For example, transmit beams of channels and/or signals sent to different TRPs at the same moment may be different, and transmit beams of channels and/or signals sent to different TRPs at the same moment need to be the same.

The third information is determined according to the downlink control channel resource group, or the downlink control information resource group is determined according to the third information, similarly, the third information may be determined according to the antenna group, or the antenna group is determined according to the third information. The antenna group is an antenna group reported by the terminal through capability information or is determined by a downlink measurement reference signal resource group reported by the terminal through channel state information (CSI). The antenna group includes a receive antenna group and/or a transmit antenna group. For example, downlink signals from different TRPs are received by different downlink receive antenna groups, and downlink signals from the same TRP are received by the same downlink receive antenna group. Uplink signals sent to different TRPs are sent by different uplink transmit antenna groups, and uplink signals sent to the same TRP are sent by the same uplink transmit antenna group. The third information corresponding to different antenna groups is different.

In an embodiment, the third-type parameter set and/or the fourth-type parameter set include at least one of the following parameters: process number set information, uplink control channel resource set information, demodulation reference signal port set information, demodulation reference signal information, quasi co-location reference signal set information, transmission configuration indication state list information, downlink data channel information, uplink data channel information, uplink control channel information, precoding resource granularity physical resource block (PRB) binding size information, rate matching information, carrier indicator information, measurement reference signal information, a generation parameter for a scrambling sequence, time advance (TA) information, port information of a control channel, a time domain resource allocation parameter, a frequency domain resource allocation parameter, aperiodic measurement reference signal information, power information, a downlink control channel resource group, an uplink signal, configuration information of a semi-persistent transmission data channel, or a high-layer configuration parameter of the downlink control information in the predetermined format.

In an embodiment, a difference set of parameter types included in the third-type parameter set and the fourth-type parameter set is non-empty.

Embodiment Four

In this embodiment, a base station configures A sets of configuration information of the fourth-type parameter set in one frequency domain bandwidth for a terminal, when one or more types of parameters in one set of configuration information in the fourth-type parameter set are not configured, configuration values of the one or more types of parameters configured in another set of configuration information are adopted, and A is a positive integer greater than 1.

In an embodiment, A sets of configuration information correspond to A downlink control channel resource groups, and a parameter value in the fourth-type parameter set of channels and/or signals scheduled by control channels in one downlink control channel resource group is determined according to a set of configuration information in the fourth-type parameter set having a correspondence with the downlink control channel resource group.

For example, the base station and the terminal configure two PDSCH-configs, {PDSCH-config0, PDSCH-config1}. When some parameters in PDSCH-config1 are not configured by the base station, the configured values of these parameters configured in PDSCH-config0 are adopted. The second-type parameter set includes parameter values included in the PDSCH-config.

In an embodiment, the fourth-type parameter set includes at least one of the following parameters: process number set information, uplink control channel resource set information, demodulation reference signal port set information, demodulation reference signal information, quasi co-location reference signal set information, transmission configuration indication state (TCI) list information, downlink data channel information, uplink data channel information, uplink control channel information, precoding resource granularity physical resource block (PRB) binding size information, rate matching information, carrier indicator information, measurement reference signal information, a generation parameter for a scrambling sequence, time advance (TA) information, port information of a control channel, a time domain resource allocation parameter, a frequency domain resource allocation parameter, aperiodic measurement reference signal information, power information, a downlink control channel resource group, an uplink signal, configuration information of a semi-persistent transmission data channel, or a high-layer configuration parameter of the downlink control information in the predetermined format. Other parameter information is not excluded either.

Embodiment Five

In this embodiment, a correspondence between a downlink control channel resource and an uplink control channel resource is established, a spatial transmit filter of the uplink control channel resource is acquired according to a quasi co-location reference signal in a quasi co-location reference signal set of a downlink control channel resource having a correspondence with the uplink control channel resource; and/or a quasi co-location reference signal in a quasi co-location reference signal set of the downlink control channel resource is acquired according to a reference signal included in spatial relation information of the uplink control channel resource.

In an embodiment, when the spatial transmit filter of the uplink control channel resource is acquired according to the quasi co-location reference signal in the quasi co-location reference signal set of the downlink control channel resource having the correspondence with the uplink control channel resource, if there are multiple quasi co-location reference signals of the downlink control channel resource, and the multiple quasi co-location reference signals are associated with different quasi co-location parameters respectively, it is specified that the spatial transmit filter of the uplink control channel resource is acquired according to a quasi co-location reference signal which is associated with a predetermined-type quasi co-location parameter and in the quasi co-location reference signal set of the downlink control channel resource having the correspondence with the uplink control channel resource, for example, the predetermined-type quasi co-location parameter includes a spatial receive parameter.

For example, a correspondence between a PUCCH resource and a CORESET is established, after configuration information of a transmission configuration indicator (TCI) (namely the quasi co-location reference signal set) of the CORESET is updated through an MAC-CE command, spatial relation information of the PUCCH resource having a correspondence with the CORESET is also updated, that is, the spatial relation information of the PUCCH resource is acquired according to a quasi co-location reference signal which is associated with the predetermined-type quasi co-location parameter and in the quasi co-location reference signal set of the updated TCI of the CORESET.

In an embodiment, the spatial relation information of the PUCCH is acquired according to an activated TCI of a CORESET having a correspondence with the PUCCH resource in a time unit where the PUCCH is located. As shown in FIG. 8, the MAC-CE for updating the CORESET is sent in the PDSCH in a slot (n), the TCI of the CORESET is updated to the TCI (such as, TCI2) included in the MAC-CE command from a slot (n+4), the previous TCI of the CORESET (such as, TCI1) is used before the slot (n+4), the PUCCH resource is sent in a slot (n+1), and the spatial transmit filter of the PUCCH resource is acquired according to the quasi co-location reference signal which is associated with the predetermined-type quasi co-location parameter and in the quasi co-location reference signal set of the TCI1.

Alternatively, a correspondence between the uplink control channel resource group and the downlink control channel resource group is established, a spatial filter of an uplink control channel in an uplink control channel resource group is acquired according to a quasi co-location reference signal associated with the predetermined-type quasi co-location parameter in a quasi co-location reference signal set of a control channel resource satisfying a predetermined feature in the downlink control channel resource group in a time unit latest to the uplink control channel resource.

In an embodiment, the control channel resource satisfying the predetermined feature exists in the downlink control channel resource group in the latest time unit, and the predetermined feature includes at least one of the following features:
    feature one: the downlink control channel resource is associated with at least one candidate control channel or search space to be monitored in the time unit; feature two: a control channel resource index of the downlink control channel resource is the lowest index in the downlink control channel resource group; feature three: at least one downlink control channel is monitored in the downlink control channel resource; feature four: the downlink control channel resource includes a downlink control channel for scheduling a predetermined channel and/or signal; where the predetermined channel and/or signal includes at least one of: an uplink control channel resource, or a physical downlink shared channel (PDSCH) corresponding to an HARQ-ACK included in the uplink control channel resource; or feature five: the downlink control channel resource includes a downlink control channel for scheduling channel state information (CSI); where the CSI is included in the uplink control channel resource.

The spatial relation information of one uplink reference signal includes one reference signal, for example, the spatial relation information of an uplink reference signal 1 includes a reference signal 2, when the reference signal 2 is an uplink reference signal, it represents that the spatial transmit filter for sending the uplink reference signal 1 is obtained according to the spatial transmit filter for sending the uplink reference signal 2; when the reference signal 2 is a downlink reference signal, it represents that the spatial transmit filter for sending the uplink reference signal 1 is obtained according to the spatial filter for receiving the downlink reference signal 2. The spatial relation information may also be referred to as a spatial filter parameter or a spatial filter relation parameter, or spatial parameter information, or other names.

The spatial transmit filter of the uplink control channel resource is acquired according to the quasi co-location reference signal associated with the predetermined quasi co-location parameter of the downlink control channel resource; spatial transmit filters of other uplink signals being acquired according to the quasi co-location reference signal acquisition associated with the predetermined quasi co-location parameter of the downlink control channel resource is not excluded in this embodiment, where the uplink signal includes: an uplink measurement reference signal, an uplink demodulation reference signal, an uplink data channel signal, a scheduling request (SR) signal, a random receive signal, and the like.

Embodiment Six

In this embodiment, the maximum number of different quasi co-location reference signals of an associated spatial receive parameter of a channel and/or signal at the same moment is less than or equal to the number of receive antenna groups reported by the terminal. The number of the receive antenna groups reported by the terminal may be included in the capability information reported by the terminal or determined by the maximum number of measurement reference signal groups reported by the terminal. Reception of measurement reference signal terminals of different measurement reference signal groups may be at the same time, and reception of measurement reference signal terminals of the same measurement reference signal group may not be at the same time.

In an embodiment, the maximum number of different quasi co-location reference signals of an associated spatial receive parameter of a channel and/or signal at the same moment is less than or equal to the number of receive antenna groups activated by a terminal side.

In an embodiment, determining the maximum number of different spatial transmit filters of H channels and/or signals according to the determined downlink control channel resource group and the intersection among time domain resources occupied by the H channels and/or signals being non-empty include that: the number of downlink control channel resource groups is in direct proportion to the maximum number of different spatial transmit filters, or the maximum number of the different spatial transmit filters is less than or equal to the number of the downlink control channel resource groups. For example, transmit beams of channels and/or signals sent to different TRPs at the same moment may be different, and transmit beams of channels and/or signals sent to different TRPs at the same moment need to be the same.

Embodiment Seven

In this embodiment, when two TRPs without an ideal backhaul serve the same UE, the transmission mechanism of DCI2_0 (i.e., information for notifying slot format information) is used. One or more of the following schemes may be adopted.

Scheme 1: corresponding high-layer parameters of the DCI2_0 are configured for each TRP, where the high-layer parameters of the DCI2_0 include at least one of the following parameters of the DCI2_0:

parameter one: overload, i.e., the total number of information bits in the DCI2_0; parameter two: slot format indication-radio network temporary identification (sfi-RNTI), i.e., a scrambling sequence parameter of the DCI2_0; or parameter three: an SlotFormatCombinationsPerCell list, this list includes SlotFormatCombinationsPerCells of one or more CCs, for each CC, one or more (SlotFormatCombination, SlotFormatCombinationsId) combinations and a starting bit index of the SFI indication information of the CC in the DCI 2_0 bit sequence are included in the SlotFormatCombinationsPerCell. One SlotFormatCombination includes a time slot structure of one or more slots, that is, a downlink time domain symbol set, a flexible time domain symbol set and downlink time domain symbol set information in one slot.

When the terminal receives the DCI2_0 sent by the base station, the DCI2_0 includes slot format indicator 1, slot format indicator 2 ... slot format indicator N, i.e., N SFI bit fields, the terminal finds the position of the SFI of each CC in the DCI2_0 according to the SlotFormatCombinationsPerCell list, such as an SFI bit field of one CC is slot format indicator 1 described above, the value indicated in slot format indicator 1 is SlotFormatCombinationsId, and then an SlotFormatCombination corresponding to the SlotFormatCombinationsId is found, and the SlotFormatCombination includes a slot structure of one or more slots corresponding to the beginning of the slot in which DCI2_0 is located and the end of multiple slots included in the SlotFormatCombination.

Since the DCI2_0 is group common control information, one particular terminal only needs to focus on the SFI field of the CC configured for the terminal itself in the DCI2_0, for example, the DCI2_0 includes the above N SFI bit fields, and terminal 1 only needs to focus on 3 SFI bit fields of the N SFI bit fields.

Different high-layer parameters of the DCI2_0 are configured for different TRPs, so that it is applicable to a scenario that frequency domain bandwidth sets (such as CC sets or BWP sets) for TRPs to work are different, and to a scenario that target terminal groups of the DCI2_0 sent by different TRPs are different. Thus, bit sequences of the DCI2_0 sent by two TRPs are allowed to be different. For example, the DCI2_0 of TRP1 includes 32 SFI fields (it may be understood as 32 terminals and/or 32 terminal and CC combinations under the coverage of TRP1), while the DCI2_0 sent by TRP2 includes 12 SFI fields. As shown in FIG. 6, for one UE, two TRPs work at different sets of CCs, TRP1 works at the set of {CC1, CC2, CC3}, and TRP2 works at the set of {CC2, CC3}, so that the two TRPs may both send the DCI2_0, and it just needs to ensure that the slot structures of {CC2, CC3} sent by two TRPs at the same moment are consistent (i.e., the case where one TRP indicates an uplink symbol and the other TRP indicates a downlink symbol in the same BWP of the same CC cannot occur). SFI information is sent only in TRP1 for the SFI of CC1. Two pieces of the DCI2_0 sent by the above two TRPs include two downlink control channel resource groups, and the DCI2_0 is sent in each downlink control channel resource group.

In scheme 1, bit sequences of the DCI2_0 sent in different downlink control channel resource groups (i.e., different TRPs) are different. For example, the DCI2_0 of TRP1 includes 64 bits and 8 SFI bit fields, {CC1, CC2, CC3} correspond to {1, 3, 5} SFI fields respectively. The DCI2_0 of TRP2 includes 128 bits and 14 SFI bit fields, {CC2, CC3} correspond to {6, 7} SFI fields respectively. Alternatively, parameter one and parameter two corresponding to the DCI2_0 of two TRPs are the same, but parameter three is different.

Scheme 2: in this scheme, the above parameters one to three of the DCI2_0 sent by two TRPs are the same, but when a third-type parameter set corresponding to one TRP is not configured in one CC, the terminal may ignore the SFI information about the one CC in the DCI2_0 sent by this one TRP, i.e., the SFI of the one CC only listens to the other TRP, for example, the third-type parameter set is PDSCH-config, where PDSCH-config0 corresponds to TRP1, and PDSCH-config1 corresponds to TRP2. If only PDSCH-config0 is configured in an activated BWP of CC1 and PDSCH-config1 is not configured, the terminal may ignore the SFI field of CC1 in DCI2_0 sent by TRP2. If PDSCH-config0 and PDSCH-config1 are configured in the activated BWPs of CC2 and CC3, the SFIs of CC2 and CC3 need to be sent by two TRPs, and the slot structures of {CC2, CC3} to be sent by two TRPs at the same moment are consistent. The third-type parameter set described above is PDSCH-config, and other third-type parameter sets are not excluded in this embodiment.

Scheme 3: always only one TRP sends the DCI2_0.

Scheme 4: two TRPs may send the DCI2_0, when CORESETs of the two TRPs overlap, only one of the two TRPs may send the DCI2_0, i.e., the SFI of one slot is determined according to the DCI2_0 sent in the lowest CORESET group latest to this slot. The DCI2_0 sent by the two TRPs are consistent.

The above TRPs correspond to downlink control channel resource groups. The DCI2_0 sent by the two TRPs being consistent includes that the two pieces of DCI2_0 in the two CORESETs correspond to the same time domain symbol of the same BWP in the same CC, but cannot correspond to one uplink symbol and one downlink symbol. That is, the two DCI2_0 in the two CORESETs both correspond to uplink symbols, both downlink symbols, one uplink symbol and one flexible symbol, or one downlink symbol and one flexible symbol.

Similarly, the above schemes 1 to 4 are also applicable to the information notification of DCI2_1, DCI2_2, and DCI2_3.

Embodiment Eight

In this embodiment, as shown in FIGS. 3, 6, 11 and 12, two TRPs without ideal backhaul communicate with the same terminal. In particular, an intersection of CCs/BWPs where the communications between the two TRPs and the terminal are located is non-empty, i.e., an intersection of CCs/BWPs where channels and/or signals between the two TRPs and the terminal are located is non-empty.

Figure 11:
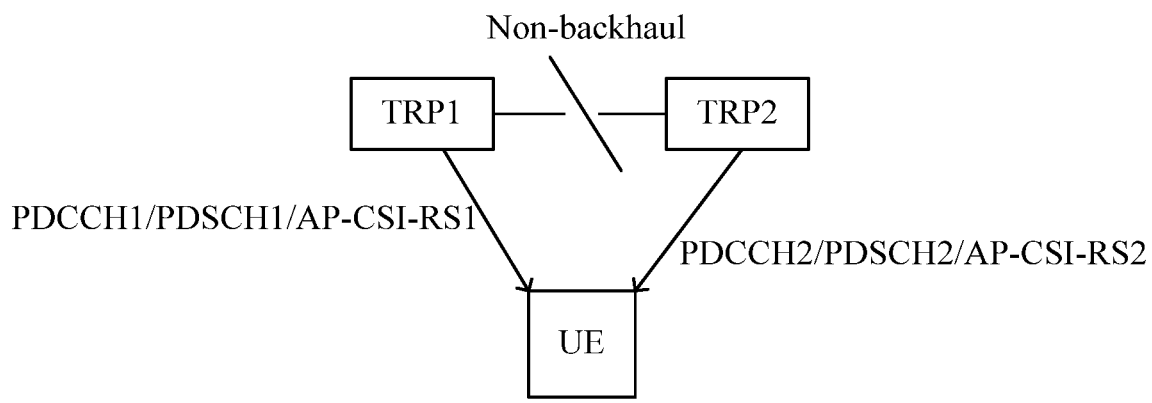
FIG. 11 is a schematic diagram illustrating an interference problem of different types of downlink information and/or signals scheduled by different TRPs in the case where the same UE is independently scheduled by two TRPs having no ideal backhaul (non-backhaul) according to an embodiment of the present disclosure.

Due to the relatively independent scheduling of signals between the two TRPs, the interference problem of two channels and/or signals scheduled by the two TRPs needs to be considered, as shown in FIG. 11, when an intersection of resources occupied by first-type downlink channels and/or signals and second-type downlink channels and/or signals is non-empty, the interference therebetween needs to be considered.

The downlink channel includes at least one of the PDCCH and the PDSCH.

The downlink signal includes at least one of a synchronization signal, a measurement reference signal or a demodulation reference signal.

The first-type downlink channels and/or signals are transmitted by TRP1, such as scheduled by a control channel in a first control channel resource group, or a quasi co-location reference signal of the first-type downlink channels and/or signals is from a first quasi co-location reference signal set.

The second-type downlink channels and/or signals are sent by TRP2, such as scheduled by a control channel in a second control channel resource group, or a quasi co-location reference signal of the second-type downlink channels and/or signals is from a second quasi co-location reference signal set.

So, one or more of the following schemes may be adopted.

Scheme 1: an interference between a PDSCHi and a PDSCHj may be solved in a measurement manner, but since each TRP dynamically schedules beams of the PDSCH in its candidate beam set, it may be considered that different TCI states correspond to different beams, but there may be no interference among some beam pairs and an interference among some other beam pairs between the candidate beam sets of the two TRPs. As a base station, scheduling among beam pairs having an interference is prevented as much as possible, two PUCCH resources in one BWP are configured for one CSI-reporting during measurement, different PUCCH resources are sent to different TRPs, different PUCCH resources belong to different PUCCH resource groups, and after the two TRPs receive a beam measurement report sent by the terminal, an interference between beams of the PDSCHi and the PDSCHj is avoided through a predetermined rule during PDSCH scheduling, for example, it is ensured that an intersection among resources occupied by the PDSCH1 and the PDSCH2 corresponding to the beam pairs having a relatively large mutual interference is empty.

Alternatively, the terminal monitors the interference between the two CSI-RS sets, and sends alarm information to one or two TRPs when the interference is greater than a predetermined threshold. For example, the first CSI-RS set includes a quasi co-location reference signal set corresponding to each of 8 bit field indication values in the TCI indication field of the DCI1 in CORESET1, and the second CSI-RS set includes a quasi co-location reference signal set corresponding to each of 8 bit field indication values in the TCI indication field of the DCI2 in CORESET2, the candidate beam of the PDSCHi sent by the TRPi is one of the 8 candidate beams of the DCIi in the CORESETi, and one candidate beam corresponding to a bit field indication value corresponds to a quasi co-location reference signal set. The terminal measures the interference (such as, a signal to interference plus noise ratio (SINR)) between any two beams in the two CSI-RS sets (i.e., two beam sets), the two beams are respectively from the two beam sets. The alarm information is sent to one or two TRPs as long as the interference of one beam pair is greater than a predetermined value (such as, the SINR is lower than the predetermined value). Alternatively, the terminal periodically reports at least one of the following information: the maximum interference (such as the minimum SINR) of beam pairs in two beam sets, the minimum interference (such as the maximum SINR) of beam pairs in the two beam sets, beam pair information corresponding to the maximum interference, beam pair information corresponding to the minimum interference, or SINR information corresponding to all beam pairs.

Scheme 2: in order to solve the interference between a PDSCHi and a PDCCHj, it is specified that the PDSCHi scheduled by a downlink control channel resource group i cannot occupy a resource occupied by a control channel in a downlink control channel resource group j, where i is not equal to j.

Scheme 3: in order to solve the interference among PDCCHs, it is specified that when an intersection among resources corresponding to a downlink control channel resource group i and a downlink control channel resource group j is non-empty, the terminal only monitors a control channel in one of the downlink control channel resource groups i and j. Alternatively, it is specified that when an intersection among resources corresponding to the downlink control channel resource group i and the downlink control channel resource group j is non-empty, channel scrambling sequence parameters corresponding to control channels in the two control channel resource groups i and j are different, or scrambling sequences are different, and i is not equal to j.

Scheme 4: in order to solve the interference between a PDSCHi and a CSI-RSj, the following schemes may be adopted:

Scheme 4.1: if an intersection between resources of a PDSCHi and a CSI-RSj is non-empty, when CSIi is reported to a TRPi, the CSIi includes one state, this state includes that whether an overlap exists between the CSI-RS for acquiring the CSIi and the PDSCHj, or whether the number of overlapping resources exceeds a predetermined value, or when the number of overlapping resources exceeds the predetermined value, the reporting of the CSIi is abandoned.

Scheme 4.2: the PDSCHi avoids resources occupied by all AP-CSI-RSj resources in the corresponding AP-CSI-RSj resource set of the TRPj. The AP-CSI-RSj resource set includes an AP-CSI-RS resource corresponding to each bit field value in the CSI request resource bit field in the DCI of the CORESETj, that is, the PDSCHi cannot occupy all possible resources in the AP-CSI-RSj.

Scheme 4.3: no quasi co-location (QCL) relationship exists between an AP-CSI-RSi and any one of potential TCI state pools (i.e., a quasi co-location reference signal set corresponding to all bit field values in the TCI bit field corresponding to the DCIj in the CORESETj) of a PDSCHj, or an AP-CSI-RSi and any one of the potential TCI state pools of the PDSCHj do not correspond to the same receive panel.

Scheme 4.4: the terminal does not expect to receive a DMRSi and an AP-CSI-RSj occupying the same time-frequency resource.

Scheme 5: in order to solve the interference between an AP-CSI-RSi and an AP-CSI-RSj, the following provisions may be adopted.

Provisioning 1: two AP-CSI-RSs are not reported after a collision.

Provisioning 2: scrambling sequences of the two AP-CSI-RSs are different.

Provisioning 3: time-frequency resources occupied by the two AP-CSI-RSs do not have an intersection.

Provisioning 4: when the reception of the two AP-CSI-RS resources cannot be at the same time, the reception of the two AP-CSI-RS resources is determined according to the priority.

Scheme 6: in order to solve the interference problem between an AP-CSI-RSi/SRSi and a channel and/or signal j, the following schemes may be adopted:

the AP-CSI-RS may be scheduled by only one of the two control channel resource groups, and/or the SRS may be scheduled by only one of the two control channel resource groups Scheme 7: in order to solve the interference between an uplink channel and/or signal i and an uplink channel and/or signal j, the following provisions may be adopted.

Provisioning 1: an intersection between resources of the uplink channel and/or signal i and the uplink channel and/or signal j is empty.

Provisioning 2: when an intersection between resources of the uplink channel and/or signal i and the uplink channel and/or signal j is non-empty, only one of the uplink channel and/or signal i and the uplink channel and/or signal j is sent according to the priority.

Figure 12:
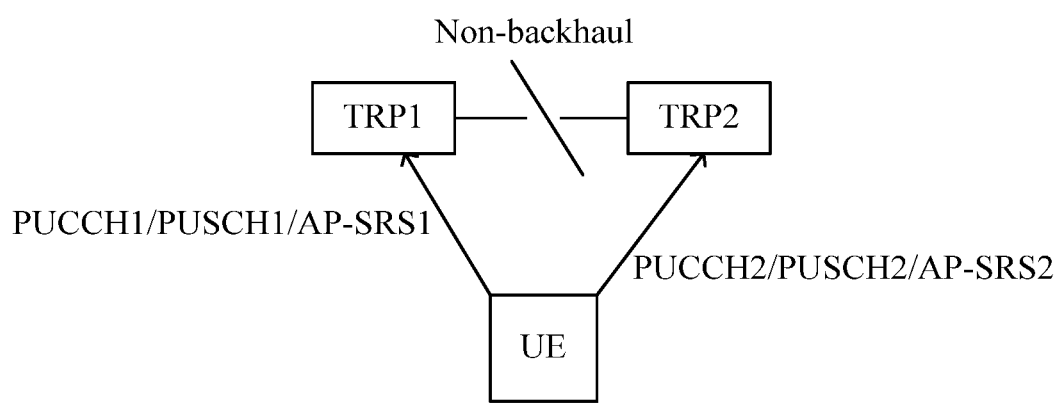
FIG. 12 is a schematic diagram illustrating an interference problem of different types of downlink information and/or signals scheduled by different TRPs in the case where the same UE is independently scheduled by two TRPs having no ideal backhaul (non-backhaul) according to an embodiment of the present disclosure.

In the above description, as shown in FIGS. 11 and 12, the channel and/or signal i corresponds to the TRPi, i is not equal to j, and the channel and/or signal i is scheduled by a control channel in a control channel resource group i.

An embodiment of the present disclosure provides a signaling information transmission method so as to reduce the signaling overhead.

Referring to FIG. 9, another embodiment of the present disclosure provides a signaling information transmission method. The signaling information transmission method includes described below.

In step 900, first signaling information is transmitted; where the first signaling information includes a spatial relation information list and one piece of spatial relation information corresponding to an uplink control channel resource group.

In the embodiments of the present disclosure, the first signaling information is high-layer signaling information, such as RRC signaling.

In another embodiment of the present disclosure, the method further includes at least one of the following steps.

In step 901, the one piece of spatial relation information of the uplink control channel resource group is updated to new spatial relation information according to second signaling information; where the second signaling information includes the new spatial relation information, a group index of the uplink control channel resource group, or old spatial relation information corresponding to the uplink control channel resource group.

In step 902, spatial relation information of one or more uplink control channel resources is activated according to third signaling information; where the third signaling information includes index information of the one or more uplink control channel resources and updating information for the spatial relation information of the one or more uplink control channel resources.

In the embodiments of the present disclosure, the second signaling information includes at least one of medium access control-control element (MAC-CE) signaling information or downlink control information (DCI) signaling information.

The third signaling information includes at least one of MAC-CE signaling information or DCI signaling information.

Figure 10:
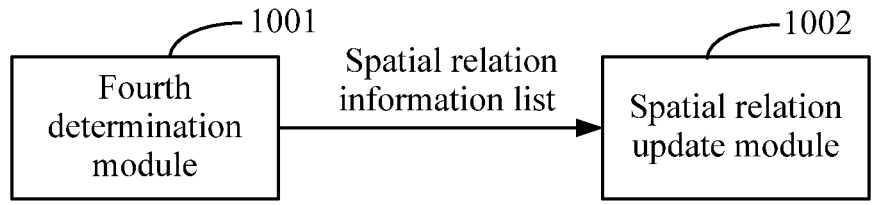
FIG. 10 is a schematic diagram of a device for updating a spatial relation provided by another embodiment of the present disclosure.

Referring to FIG. 10, another embodiment of the present disclosure provides a signaling information transmission device. The signaling information transmission device includes a fourth determination module 1001.

The fourth determination module 1001 is configured to transmit first signaling information, where the first signaling information includes a spatial relation information list and one piece of spatial relation information corresponding to an uplink control channel resource group.

In another embodiment of the disclosure, the signaling information transmission device further includes a spatial relation update module 1002. The spatial relation update module 1002 is configured to perform at least one of:

updating the one piece of spatial relation information of the uplink control channel resource group to new spatial relation information according to second signaling information; where the second signaling information includes the new spatial relation information, a group index of the uplink control channel resource group, or old spatial relation information corresponding to the uplink control channel resource group; or activating spatial relation information of one or more uplink control channel resources according to third signaling information; where the third signaling information includes index information of the one or more uplink control channel resources and updating information for the spatial relation information of the one or more uplink control channel resources.

The first signaling information includes radio resource control (RRC) signaling information.

The second signaling information includes at least one of medium access control-control element (MAC-CE) signaling information or downlink control information (DCI) signaling information.

The third signaling information includes at least one of MAC-CE signaling information or DCI signaling information.

Another embodiment of the present disclosure provides a signaling information transmission device. The signaling information transmission device includes a processor and a computer-readable storage medium. The computer-readable storage medium stores an instruction, and when the instruction is executed by the processor, any one of the signaling information transmission methods described above is implemented.

Another embodiment of the present disclosure provides a computer-readable storage medium. The computer-readable storage medium stores a computer program. When the computer program is executed by a processor, any one of the signaling information transmission methods described above is implemented.

Embodiment Nine

In this embodiment, RRC signaling configures one piece of spatial relation information for one or more PUCCH resources, a spatial relation information list may also be included in the PUCCH-config, and the spatial relation of the PUCCH resource group may be updated to be any spatial relation in the spatial relation list through a medium access control-control element (MAC-CE) command or DCI.

Therefore, when the spatial relation list in the PUCCH-config includes multiple spatial relations, not every PUCCH resource needs to be updated by using an MAC-CE command. The base station may update when the base station wants to, and when the base station does not want to update, the spatial relation of each PUCCH resource is not updated by using the MAC-CE command, so that the MAC-CE command is saved, and the implementation flexibility of the base station is improved.

In an embodiment, PUCCHs with the same reference signal in the spatial relation information notified in the RRC signaling (namely, the first signaling information) form one PUCCH resource group, and new spatial relation information and PUCCH resource group information are carried in the MAC-CE (namely, the second signaling information), so that the spatial information of all PUCCH resources in the PUCCH resource group is updated to the spatial relation corresponding to the new spatial relation information. The PUCCH resource group information may be index information of the PUCCH resource group and may also be old spatial relation information, and PUCCH resources having the old spatial relation form the PUCCH resource group.

In an embodiment, the MAC-CE command (i.e., the third signaling information) may also update spatial relation information of one or more PUCCH resources, such as spatial relation information and index information of the one or more piece of PUCCH resource are notified in the MAC-CE command (for example, one or more indexes of the one or more PUCCH resources are notified in a bitmap manner, or an index for each PUCCH resource is notified).

In an embodiment, after the terminal receives the MAC-CE command (i.e., the third signaling information), the terminal may re-determine the PUCCH resource groups, that is, the PUCCH resource groups notified by the RRC signaling, and the PUCCH resource groups may be re-divided through the third signaling information. PUCCHs with the same reference signal in the spatial relation information form one PUCCH resource group. For example, three PUCCH resource groups are notified by the RRC signaling, and more than three PUCCH resource groups may be formed after the third signaling information. Alternatively, two PUCCH resource groups are formed after the second signaling information.

All or some of the steps in the methods, systems, functional modules/units in the apparatus disclosed above may be implemented as software, firmware, hardware, and suitable combinations thereof. In a hardware implementation, the division between functional modules/units mentioned in the above description does not necessarily correspond to the division of physical assemblies; for example, one physical component may have multiple functions or one function or step may be performed by several physical assemblies in cooperation. Some or all of the assemblies may be implemented as software executed by a processor, such as a digital signal processor or a microprocessor, or as hardware, or as an integrated circuit such as an application specific integrated circuit. Such software may be distributed on computer-readable media, which may include computer storage media (or non-transitory media) and communication media (or transitory media). The term "computer storage media" includes volatile and nonvolatile, removable and non-removable media implemented in any method or technology for storage of information (such as computer-readable instructions, data structures, program modules or other data). The computer storage media include, but are not limited to, a random access memory (RAM), a read-only memory (ROM), an electrically erasable programmable read-only memory (EEPROM), a flash memory or other memory technology, a compact disc read-only memory (CD-ROM), a digital video disc (DVD), or other optical disk storage, a magnetic cassette, a magnetic tape, a magnetic disk storage or other magnetic storage devices, or any other medium which may be used for storing the desired information and which may be accessed by a computer. Further, the communication media typically embodies a computer-readable instruction, a data structure, a program module, or other data in a modulated data signal such as a carrier wave or other transport mechanism, and may include any information delivery media.

What is claimed is:

1. An information transmission method, comprising:
    determining second information including a frequency domain bandwidth set and first information;
    determining a hybrid automatic repeat request acknowledge (HARQ-ACK) codebook to be transmitted according to the determined second information; and
    transmitting the HARQ-ACK codebook,
    wherein the frequency domain bandwidth set is determined according to a control channel resource group to which a downlink control channel resource belongs, and a relationship between the control channel resource group and the frequency domain bandwidth set,
    wherein the control channel resource group refers to one of N downlink control channel resource groups, and each of the N downlink control channel resource groups corresponds to one of N frequency domain bandwidth sets,
    wherein the HARQ-ACK codebook corresponds to one of N types of HARQ-ACK codebooks, and each of the N types of HARQ-ACK codebooks corresponds to one of the N downlink control channel resource groups,
    wherein the frequency domain bandwidth set refers to one of N frequency domain bandwidth sets, and each of the N frequency domain bandwidth sets corresponds to one of the N types of HARQ-ACK codebooks,
    wherein N is an integer greater than or equal to 2;
    wherein first information includes a time interval set between a physical downlink shared channel (PDSCH) and an HARQ-ACK codebook corresponding to the PDSCH; a time domain resource set where the PDSCH is located; a maximum number of code block groups (CBGs) included in one transmission block (TB); whether HARQ-ACK feedback bits corresponding to two TBs of one PDSCH are subjected to a bundle operation; the maximum number of TBs, or CWs included in one PDSCH.

2. The method of claim 1, wherein the relationship between the control channel resource group and the frequency domain bandwidth set includes a first correspondence between the control channel resource group and the frequency domain bandwidth set.

3. An information transmission device, comprising at least one processor and a computer-readable storage medium; wherein the computer-readable storage medium stores an instruction, and the instruction, when executed by the at least one processor, implements an information transmission method, comprising:
determining second information including a frequency domain bandwidth set and first information;
determining a hybrid automatic repeat request acknowledge (HARQ-ACK) codebook to be transmitted according to the determined second information; and
transmitting the HARQ-ACK codebook,
wherein the frequency domain bandwidth set is determined according to a control channel resource group to which a downlink control channel resource belongs, and a relationship between the control channel resource group and the frequency domain bandwidth set,
wherein the control channel resource group refers to one of N downlink control channel resource groups, and each of the N downlink control channel resource groups corresponds to one of N frequency domain bandwidth sets,
wherein the HARQ-ACK codebook corresponds to one of N types of HARQ-ACK codebooks, and each of the N types of HARQ-ACK codebooks corresponds to one of the N downlink control channel resource groups,
wherein the frequency domain bandwidth set refers to one of N frequency domain bandwidth sets, and each of the N frequency domain bandwidth sets corresponds to one of the N types of HARQ-ACK codebooks,
wherein N is an integer greater than or equal to 2;
wherein first information includes a time interval set between a physical downlink shared channel (PDSCH) and an HARQ-ACK codebook corresponding to the PDSCH; a time domain resource set where the PDSCH is located; a maximum number of code block groups (CBGs) included in one transmission block (TB); whether HARQ-ACK feedback bits corresponding to two TBs of one PDSCH are subjected to a bundle operation; the maximum number of TBs, or CWs included in one PDSCH.

4. The device of claim 3, wherein the relationship between the control channel resource group and the frequency domain bandwidth set includes a first correspondence between the control channel resource group and the frequency domain bandwidth set.

* * * * *